United States Patent
Kurinami et al.

(10) Patent No.: US 12,033,095 B2
(45) Date of Patent: Jul. 9, 2024

(54) TERMINAL, OPERATION INFORMATION ACQUISITION SYSTEM, OPERATION INFORMATION ACQUISITION METHOD, AND PROGRAM

(71) Applicant: Komatsu Ltd., Tokyo (JP)

(72) Inventors: Kousuke Kurinami, Tokyo (JP); Keisuke Kaneso, Tokyo (JP); Takaya Oshikawa, Tokyo (JP)

(73) Assignee: Komatsu Ltd., Tokyo (JP)

( * ) Notice: Subject to any disclaimer, the term of this patent is extended or adjusted under 35 U.S.C. 154(b) by 774 days.

(21) Appl. No.: 17/253,915

(22) PCT Filed: Jul. 12, 2019

(86) PCT No.: PCT/JP2019/027624
§ 371 (c)(1),
(2) Date: Dec. 18, 2020

(87) PCT Pub. No.: WO2020/054206
PCT Pub. Date: Mar. 19, 2020

(65) Prior Publication Data
US 2021/0272046 A1 Sep. 2, 2021

(30) Foreign Application Priority Data

Sep. 14, 2018 (JP) ................................. 2018-172709

(51) Int. Cl.
*G06Q 10/0631* (2023.01)
*E21C 35/24* (2006.01)
(Continued)

(52) U.S. Cl.
CPC ...... *G06Q 10/063114* (2013.01); *E21C 35/24* (2013.01); *G05D 1/0044* (2013.01); *G06Q 50/02* (2013.01)

(58) Field of Classification Search
CPC ..... G06Q 10/00–50/00; E21C 25/00–2100/00; G05D 1/00–2111/00
(Continued)

(56) References Cited

U.S. PATENT DOCUMENTS 4,963,865 A * 10/1990 Ichikawa ............. G09B 29/106
73/178 R
5,936,631 A * 8/1999 Yano .................... G09B 29/106
701/428
(Continued)

FOREIGN PATENT DOCUMENTS

CN 104635689 A 5/2015
CN 105684587 A 6/2016
(Continued)

*Primary Examiner* — Alan S Miller
(74) *Attorney, Agent, or Firm* — Locke Lord LLP

(57) ABSTRACT

A terminal includes a display unit, a map information storage unit that stores map information including a traveling route of a work vehicle in association with absolute position information, a display control unit that displays the map, an indication reception unit that receives first indication information indicating, on the map, an acquisition start position where acquisition of operation information of the work vehicle starts and second indication information indicating, on the map, an acquisition end position where the acquisition of the operation information ends, a first setting unit that sets the acquisition start position to cross the traveling route based on the map information and the first indication information, a second setting unit that sets the acquisition end position to cross the traveling route based on the map information and the second indication information, and an output unit that outputs information regarding the set acquisition start position and acquisition end position.

12 Claims, 16 Drawing Sheets

(51) Int. Cl.
*G05D 1/00* (2024.01)
*G06Q 50/02* (2024.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,346,893 | B1* | 2/2002 | Hirano | G01C 21/343 |
| | | | | 340/988 |
| 9,465,890 | B1* | 10/2016 | Wilson | G06F 16/9038 |
| 10,710,595 | B2* | 7/2020 | Suzuki | G07C 5/085 |
| 2004/0204827 | A1* | 10/2004 | Usui | G01C 21/30 |
| | | | | 340/995.19 |
| 2006/0020430 | A1* | 1/2006 | Gipps | G06Q 10/047 |
| | | | | 703/1 |
| 2007/0109323 | A1* | 5/2007 | Nakashima | G09G 5/14 |
| | | | | 345/661 |
| 2008/0084324 | A1* | 4/2008 | Wallace | G06Q 10/06 |
| | | | | 340/679 |
| 2010/0171757 | A1* | 7/2010 | Melamed | G06F 16/29 |
| | | | | 382/113 |
| 2015/0081399 | A1* | 3/2015 | Mitchell | G08G 1/20 |
| | | | | 705/7.38 |
| 2015/0161969 | A1* | 6/2015 | Zaizen | G06T 11/60 |
| | | | | 345/629 |
| 2015/0167461 | A1* | 6/2015 | Sugihara | E21C 35/00 |
| | | | | 299/1.05 |
| 2015/0329102 | A1* | 11/2015 | Yoshikawa | B60W 10/06 |
| | | | | 701/1 |
| 2016/0169679 | A1* | 6/2016 | Kajino | G01S 19/42 |
| | | | | 701/491 |
| 2016/0253853 | A1* | 9/2016 | Yamamoto | G06Q 10/06 |
| | | | | 701/50 |
| 2017/0076517 | A1* | 3/2017 | Harter | G06Q 10/063114 |
| 2018/0164117 | A1* | 6/2018 | Sakaguchi | G06F 3/04883 |
| 2018/0210092 | A1* | 7/2018 | Shinkai | G01S 19/05 |
| 2018/0374364 | A1* | 12/2018 | Kennedy | H04W 4/38 |

FOREIGN PATENT DOCUMENTS

| | | | |
|---|---|---|---|
| CN | 108333597 A | | 7/2018 |
| JP | 2012-207998 A | | 10/2012 |
| JP | 2015-114860 A | | 6/2015 |
| JP | 2015173630 A | * | 10/2015 |
| JP | 2015-214294 A | | 12/2015 |
| WO | 2015/029228 A1 | | 3/2015 |
| WO | 2015/136647 A1 | | 9/2015 |

* cited by examiner

TERMINAL, OPERATION INFORMATION ACQUISITION SYSTEM, OPERATION INFORMATION ACQUISITION METHOD, AND PROGRAM

TECHNICAL FIELD

The present invention relates to a terminal, an operation information acquisition system, an operation information acquisition method, and a program.

Priority is claimed on Japanese Patent Application No. 2018-172709, filed Sep. 14, 2018, the content of which is incorporated herein by reference.

BACKGROUND ART

In a mining site of a mine, an operation status of a work vehicle, such as a hydraulic excavator or a dump truck, is evaluated, and inappropriate driving is suppressed based on an evaluation result, thereby achieving improvement of productivity and prevention of the occurrence of an abnormality on the work vehicle.

Patent Literature 1 discloses a technique that, in a mining site of a mine, acquires and accumulates operation information (for example, traveling time, traveling distance, engine coolant temperature, presence or absence of an abnormality, and the like) indicating an operation status of a work vehicle along with position information and evaluates the operation status of the work vehicle based on the accumulated operation information.

CITATION LIST

Patent Literature

[Patent Literature 1]
PCT International Publication No. WO2015/029228

SUMMARY OF INVENTION

Technical Problem

In a case of evaluating the operation status of the work vehicle, a lot of time and labor may be required for an operation to extract operation information to be evaluated from all of a large amount of accumulated operation information. For this reason, there is demand for a technique that extracts operation information to be evaluated at the stage of acquiring such operation information.

In consideration of the above-described problem, an object of the present invention is to provide a terminal, an operation information acquisition system, an operation information acquisition method, and a program capable of extracting operation information to be evaluated in a stage of acquiring operation information of a work vehicle.

Solution to Problem

According to an aspect of the present invention, a terminal includes a display unit, a map information storage unit that stores map information relating to a map including a traveling route of a work vehicle in association with absolute position information, a display control unit that displays the map on the display unit, an indication reception unit that receives first indication information indicating, on the map, an acquisition start position where acquisition of operation information of the work vehicle starts and second indication information indicating, on the map, an acquisition end position where the acquisition of the operation information ends, a first setting unit that sets the acquisition start position to cross the traveling route based on the map information and the first indication information, a second setting unit that sets the acquisition end position to cross the traveling route based on the map information and the second indication information, and an output unit that outputs information regarding the set acquisition start position and acquisition end position.

Advantageous Effects of Invention

According to the above-described aspect, it is possible to extract operation information to be evaluated in a stage of acquiring operation information of a work vehicle.

DESCRIPTION OF EMBODIMENTS

First Embodiment

Figure 1:
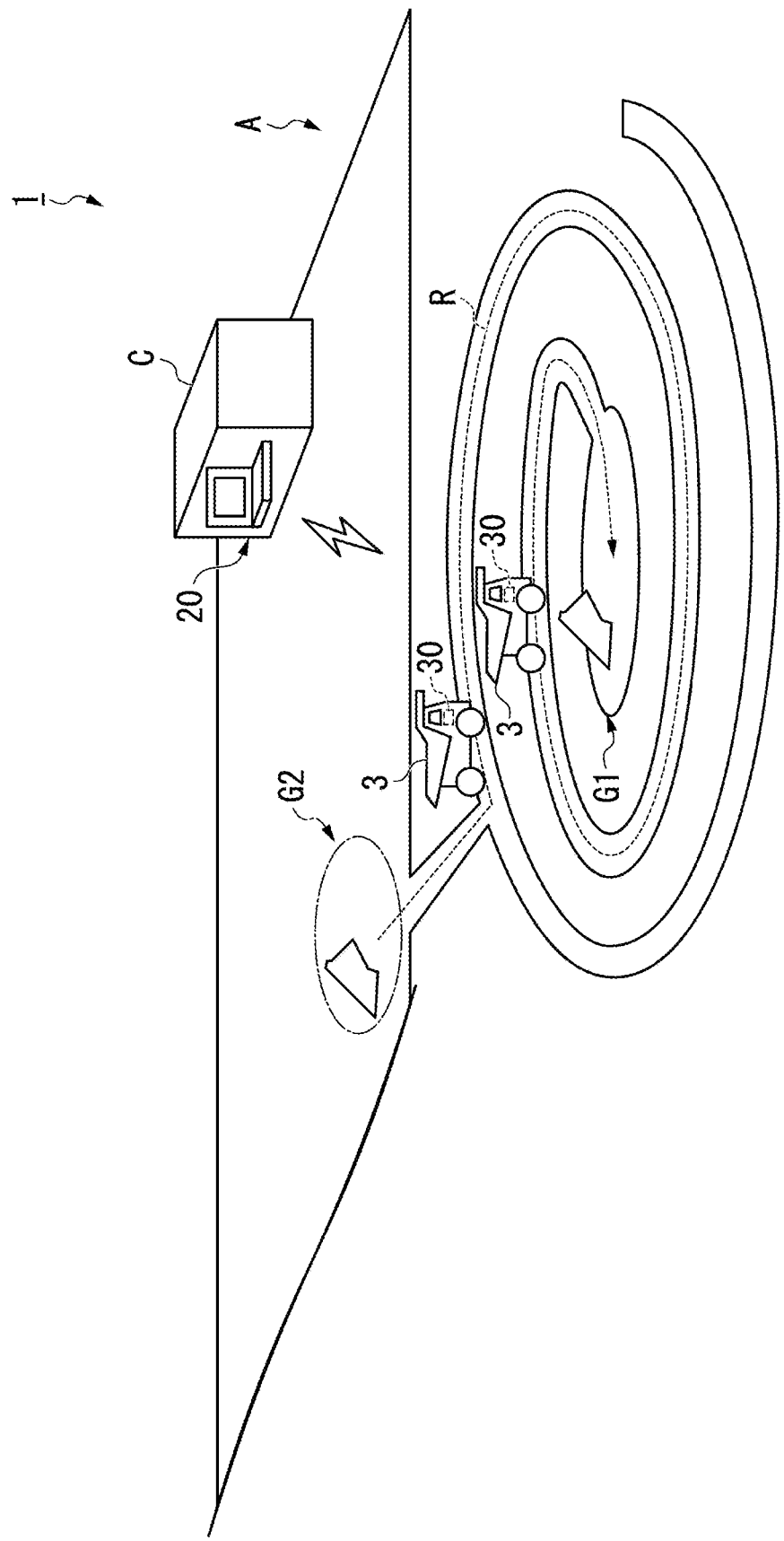
FIG. 1 is a schematic view showing the configuration of an operation information acquisition system according to a first embodiment.

FIG. 1 is a schematic view showing the configuration of an operation information acquisition system according to a first embodiment.

An operation information acquisition system 1 acquires operation information indicating an operation status of a work vehicle 3 that travels in a work site A, such as a mining site of a mine. In the work site A, at least one work vehicle 3 exists. In the first embodiment, a case where two work vehicles 3 exist will be described.

The operation information acquisition system 1 includes a terminal 20 and an operation information acquisition device 30. The terminal 20 is provided in a management office C in the work site A. The terminal 20 may be portable instead of being provided in the management office C at all times. The terminal 20 may be provided at a place other than the management office C. That is, the terminal 20 may be at a remote location away from the work site A. The operation information acquisition device 30 is provided inside the work vehicle 3. The operation information acquisition device 30 may be provided other than the inside of the work vehicle 3.

As the terminal 20, for example, a mobile phone, a smartphone, a portable computer, a personal computer, an in-vehicle computer, or the like can be used. The operation information acquisition device 30 provided in the work vehicle 3 may be, for example, a storage device, a mobile phone, a smartphone, a portable computer, or the like provided in the work vehicle 3, may be carried with a worker of the work vehicle 3, or may exist somewhere in a cab of the work vehicle 3.

The work vehicle 3 is movable instrument that travels in the work site A, such as a mining site of a mine, and operates. The work vehicle 3 is a target of operation information acquisition by the operation information acquisition system 1. Although the work vehicle 3 shown in FIG. 1 is a dump truck that performs transportation work of earth or the like, the work vehicle 3 may be, for example, a hydraulic excavator, a bulldozer, a wheel loader, a motorized grader, or the like that performs filling work or excavation work.

(Structure of Work Vehicle)

Figure 2:
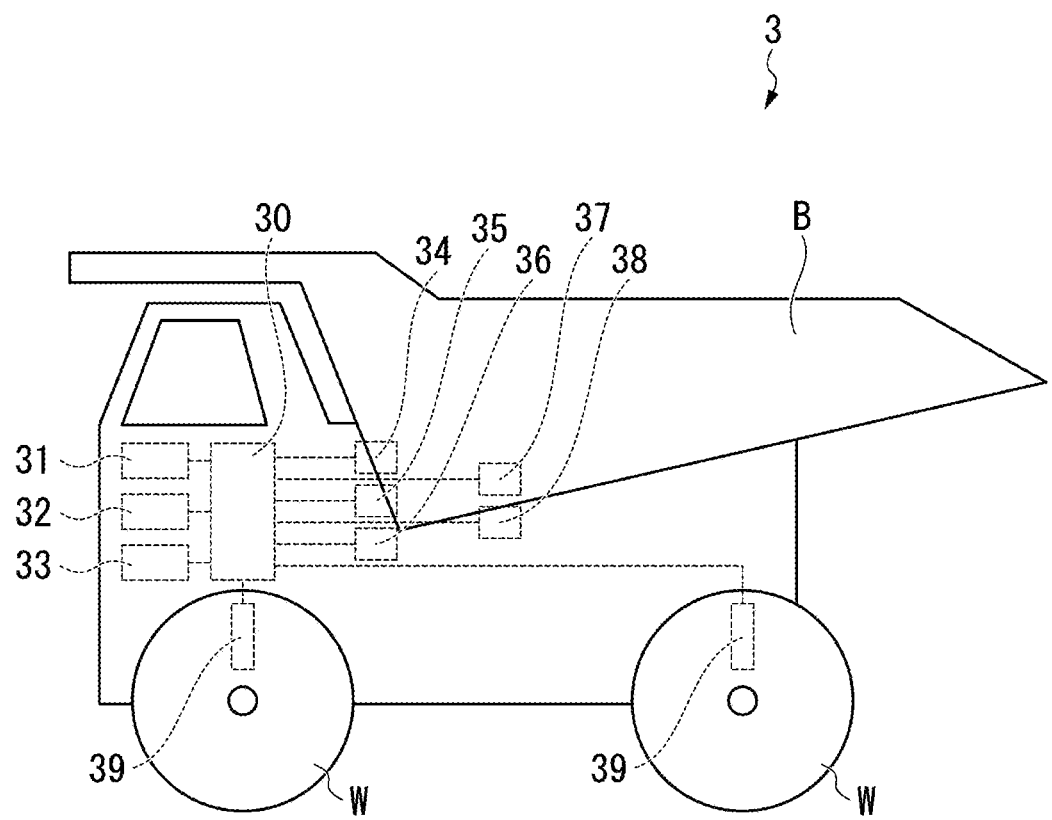
FIG. 2 is a diagram showing the structure of a work vehicle according to the first embodiment.

FIG. 2 is a diagram showing the structure of the work vehicle according to the first embodiment.

As shown in FIG. 1, the work vehicle 3 shown in FIG. 2 is a rigid dump truck that travels on a traveling route R from a loading site G1 to a dumping site G2 of the work site A and transports earth. The work vehicle 3 includes a loading platform B that accommodates earth to transport. A hoist cylinder (not shown) is connected to the loading platform B, and the loading platform B can be lifted up and down with expansion and contraction of the hoist cylinder. In other embodiments, the work vehicle 3 may be an articulated dump truck. The work vehicle 3 that is a dump truck rotates an engine with an internal combustion engine and drives wheels W to travel. In other embodiments, the work vehicle 3 may drive the wheels W using a drive system other than engine drive, for example, electric drive. The work vehicle 3 can change a shift stage of a transmission by a shift stage operation of the worker during traveling as necessary to adjust a vehicle speed.

As shown in FIG. 2, the work vehicle 3 includes the operation information acquisition device 30. The work vehicle 3 includes a plurality of detection devices that are connected to the operation information acquisition device 30 and detect operation information indicating the operation status of the work vehicle 3. Specifically, the work vehicle 3 includes a position information detection device 31, a vibration information detection device 32, a vehicle speed information detection device 33, a fuel efficiency information detection device 34, a posture information detection device 35, an operation signal detection device 36, a shift stage information detection device 37, a hydraulic pressure information detection device 38, and a weight information detection device 39 connected to the operation information acquisition device 30. A plurality of detection devices shown in FIG. 2 are merely examples, and in other embodiments, all of the above-described detection devices may not be provided or a detection device other than the above-described detection devices may be further provided.

Here, the operation information of the work vehicle 3 means all kinds of information that can be used in evaluating the operation status of the work vehicle 3. The operation status of the work vehicle 3 can be evaluated based on the operation information of the work vehicle 3 and measures can be taken to achieve improvement of productivity and prevention of the occurrence of an abnormality on the work vehicle 3 based on an evaluation result. As the operation information of the work vehicle 3, for example, current position information, vibration information, vehicle speed information, fuel efficiency information, posture information, operation signal information, shift stage information, hydraulic pressure information, weight information, and the like of the work vehicle 3 are exemplified.

For example, in a situation in which the work vehicle 3 should normally travel in a shift stage F4 with excellent fuel efficiency and at an engine rotation speed 1300 rpm, in a case where a shift stage F3 (shift stage information) and an engine rotation speed 1800 rpm (vehicle speed information) are obtained as the operation information of the work vehicle 3, the operation status of the work vehicle 3 can be evaluated (diagnosed) such that the fuel efficiency of the work vehicle 3 is deteriorated.

In the first embodiment, although only the current position information, the vibration information, the vehicle speed information, the fuel efficiency information, the posture information, the operation signal information, the shift stage information, the hydraulic pressure information, and the weight information of the work vehicle 3 are exemplified as the operation information that is acquired by the operation information acquisition system 1, in other embodiments, for example, other kinds of operation information, such as traveling distance information, time information, dumping information, loading information, engine coolant temperature information, and event information (vehicle error information, abnormal driving information, failure information, or the like) may be acquired.

The position information detection device 31 detects a current position of the work vehicle 3 by, for example, a global navigation satellite system (GNSS) or the like. The vibration information detection device 32 detects the vibration information of the work vehicle 3. The vibration information detection device 32 may be, for example, a vibration sensor or the like that detects vibration of the work vehicle 3. The vehicle speed information detection device 33 detects the vehicle speed information of the work vehicle 3. The vehicle speed information detection device 33 may be, for example, a rotation sensor that detects a rotation speed of the engine of the work vehicle 3. The fuel efficiency information detection device 34 detects the fuel efficiency information of the work vehicle 3. The fuel efficiency information detection device 34 may be, for example, a fuel meter that detects a remaining fuel amount. The posture information detection device 35 detects the posture information of the work vehicle 3. The posture information detection device 35 may be, for example, an inclination sensor, a gyro sensor, or the like that detects inclination or the like of the work vehicle 3.

The operation signal detection device 36 detects the operation signal information of the work vehicle 3. The operation signal detection device 36 may be, for example, a sensing device or the like that detects an operation signal generated by an operation (for example, a lever operation for an instruction to lift up and down the loading platform, a steering operation for swing, or the like) on the work vehicle 3 by the worker of the work vehicle 3. The shift stage information detection device 37 detects the shift stage information by the worker of the work vehicle 3. The shift stage information detection device 37 may be, a sensing device or the like that detects a shift stage operation by the worker of the work vehicle 3. The hydraulic pressure information detection device 38 detects the hydraulic pressure information of the work vehicle 3. The hydraulic pressure information detection device 38 may be, for example, a hydraulic pressure sensor or the like that detects hydraulic pressure of hydraulic oil supplied to the hoist cylinder for lifting up and down the loading platform of the work vehicle 3. The weight information detection device 39 detects the weight information of the work vehicle 3. The weight information detection device 39 may be, for example, a pressure sensor or the like that is provided in a suspension cylinder attached to each wheel W of the work vehicle 3. A load weight loaded on the loading platform B of the work vehicle 3 can be calculated from a pressure value of the pressure sensor.

The operation information acquisition device 30 can acquire the position information, the vibration information, the vehicle speed information, the fuel efficiency information, the posture information, the operation signal information, the shift stage information, the hydraulic pressure information, and the weight information from the position information detection device 31, the vibration information detection device 32, the vehicle speed information detection device 33, the fuel efficiency information detection device 34, the posture information detection device 35, the operation signal detection device 36, the shift stage information detection device 37, the hydraulic pressure information detection device 38, and the weight information detection device 39.

(Functional Configuration of Terminal)

Figure 3:
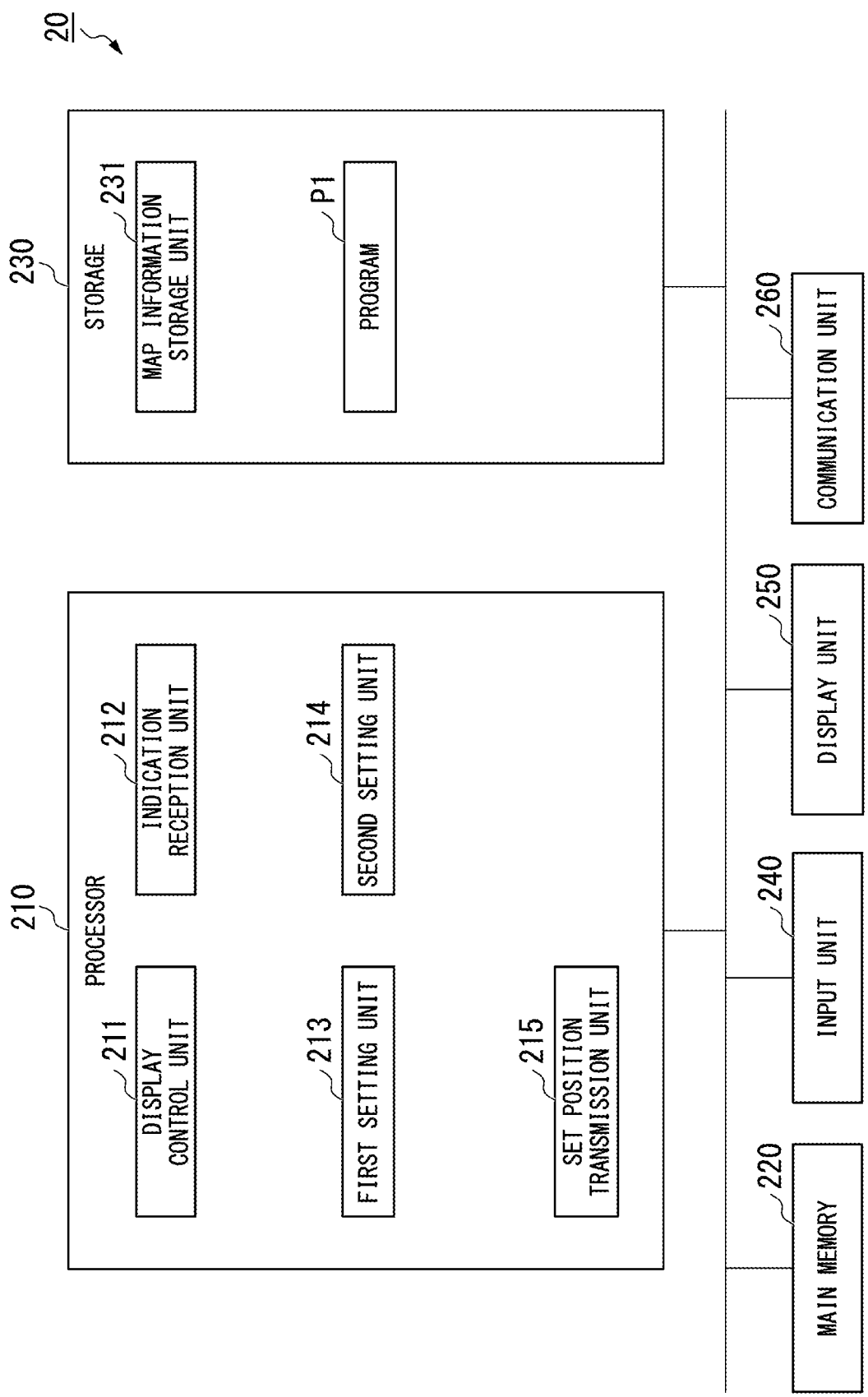
FIG. 3 is a diagram showing the functional configuration of a terminal according to the first embodiment.

FIG. 3 is a diagram showing the functional configuration of the terminal according to the first embodiment.

The terminal 20 can set acquisition conditions (an acquisition start position and an acquisition end position described below) of the operation information of the work vehicle 3 for the traveling route R on which the work vehicle 3 travels in the work site A. In the first embodiment, a case where an inputter in the management office C sets the acquisition conditions using the terminal 20 will be described.

The terminal 20 includes a processor 210, a main memory 220, a storage 230, an input unit 240, a display unit 250, and a communication unit 260.

The processor 210 is a processor that controls the whole operation of the terminal 20. Various functions of the processor 210 will be described below.

The main memory 220 is a so-called main storage device. Instructions and data necessary for the processor 210 to operate based on a program are developed to the main memory 220.

The input unit 240 is an input device. The input unit 240 is, for example, a general mouse, a keyboard, a touch sensor, or the like.

The display unit 250 is a display device that is configured to display information visible. The display unit 250 is, for example, a liquid crystal display, an organic EL display, or the like.

Figure 4:
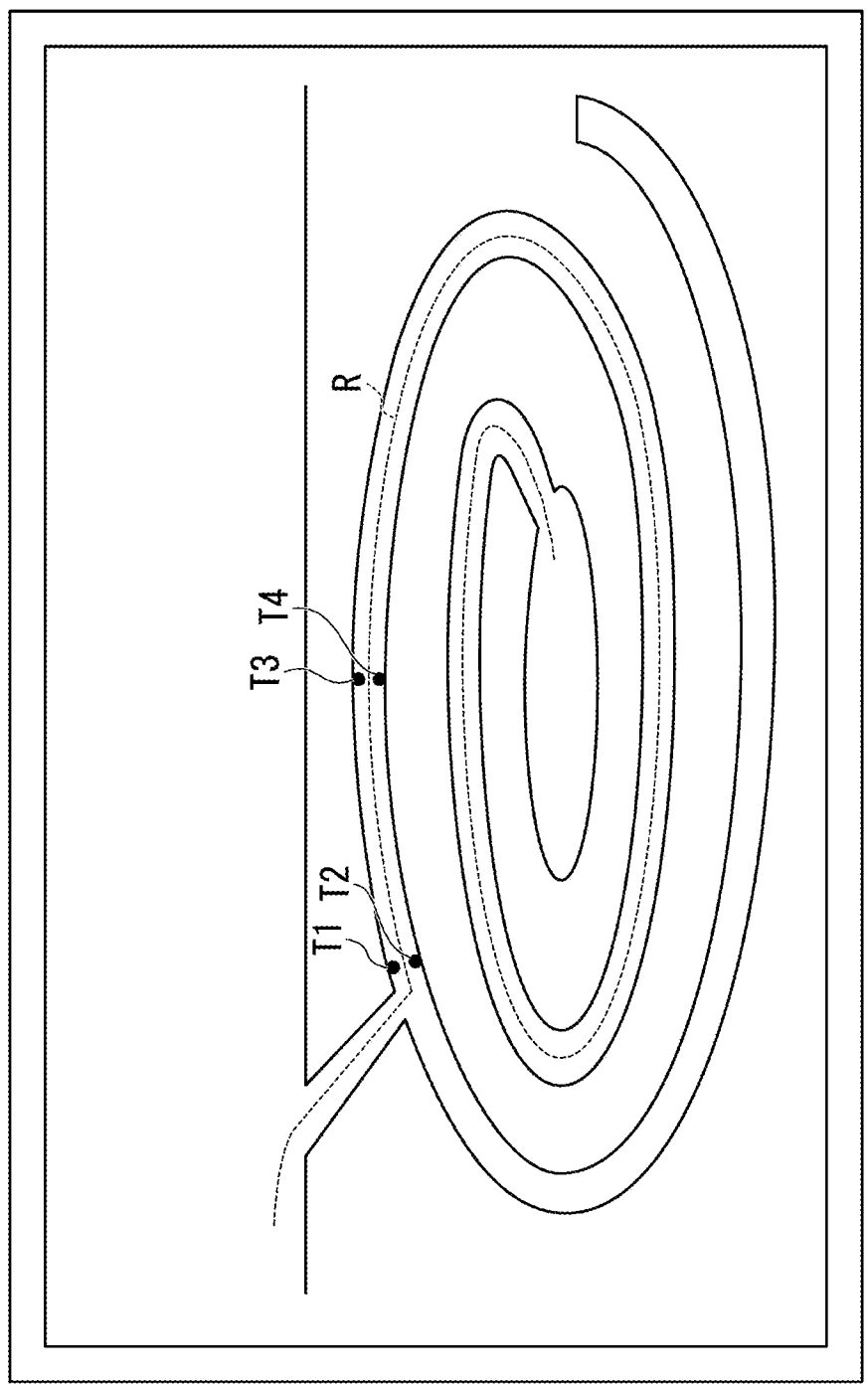
FIG. 4 is a diagram showing an example where a map is displayed on a display unit of the terminal according to the first embodiment.

FIG. 4 is a diagram showing an example where a map is displayed on a display unit of the terminal according to the first embodiment. As shown in FIG. 4, the terminal 20 according to the first embodiment is a touch display in which a display unit 250 and an input unit 240 are integrated. As shown in FIG. 4, the display unit 250 may display the traveling route R of the work vehicle 3 along with the map. The map is displayed based on map information. Though the details of the map information will be described below, for example, the map information includes a position or a shape of the traveling route R of the work site A and a position or a shape of the loading site G1 or the dumping site G2. The inputter can input the touched position as indication information by touching any position on the map displayed on the display unit 250. In FIG. 4, an example where the inputter touches the map displayed on the display unit 250 in turn to input four pieces of indication information T1 to T4 is shown. In other embodiments, the display unit 250 and the input unit 240 may be separate devices.

The communication unit 260 is a communication interface that is provided for the terminal 20 to perform communication with the operation information acquisition device 30. The communication unit 260 may be, for example, wireless communication instrument, a network card, or the like.

In the first embodiment, with regard to the communication by the communication unit 260, wireless communication is performed directly between the terminal 20 and the operation information acquisition device 30. In other embodiments, communication in the communication unit 260 may be wired communication or may be communication through the Internet.

The storage 230 is a so-called auxiliary storage device, and is, for example, a hard disk drive (HDD), a solid state drive (SSD), or the like. The storage 230 stores a program P1. The processor 210 reads the program P1 from the storage 230, develops the program P1 to the main memory 220, and executes processing according to the program P1.

The storage 230 has a storage area as a map information storage unit 231. In the map information storage unit 231, the map information relating to the map including the traveling route R of the work vehicle 3 is stored in association with absolute position information. The map information is, for example, information regarding a photograph, a picture, a drawing, a satellite photograph, a segment of video acquired by a drone, or the like. The absolute position information is, for example, information indicating an absolute position on predetermined absolute coordinates, such as latitude information and longitude information.

The traveling route R that is included in the map information stored in the map information storage unit 231 is associated with a vehicle ID allocated to each work vehicle 3. The vehicle ID is constituted by, for example, alphabet characters, numerals, symbols, and the like, and is identification information capable of uniquely specifying the work vehicle 3. The traveling route R is associated with information regarding a route width (for example, 10 m or the like) defined in advance.

Accordingly, the traveling route R that is included in the map information includes the vehicle ID and information regarding the route width.

The functions of the processor 210 of the terminal 20 according to the first embodiment will be described in detail. The processor 210 operates based on the predetermined program P1, thereby exhibiting functions as a display control unit 211, an indication reception unit 212, a first setting unit 213, a second setting unit 214, and a set position transmission unit 215.

The display control unit 211 reads the map information from the map information storage unit 231 and displays the map on the display unit 250 based on the map information.

The indication reception unit 212 receives an instruction that is input by the inputter through the input unit 240. Specifically, the indication reception unit 212 receives first indication information indicating, on the map, an acquisition start position where acquisition of the operation information of the work vehicle 3 starts and second indication information indicating, on the map, an acquisition end position where the acquisition of the operation information ends. In the first embodiment, the inputter touches two different points on the map displayed on the display unit 250 in turn to input the first indication information (T1, T2), and next, further touches two different points in turn to input the second indication information (T3, T4).

Accordingly, each of the first indication information and the second indication information includes information regarding two positions on the map. In a case where the acquisition start position or the acquisition end position cannot be specified, such as a case where positions touched two times are too far from each other, the indication reception unit 212 may not receive the input indication information.

In other embodiments, the indication reception unit 212 may receive the first indication information and the second indication information input by the inputter through the input unit 240, such as a mouse or a keyboard, other than the touch sensor. In this case, the indication reception unit 212 may receive the first indication information and the second indication information as a specific input value (numerical value, character string, or the like), such as coordinates on the map or absolute position coordinates.

The first setting unit 213 sets the acquisition start position of the operation information to cross the traveling route R based on the map information read from the map information storage unit 231 and the first indication information received by the indication reception unit 212.

The second setting unit 214 sets the acquisition end position of the operation information to cross the traveling route R based on the map information read from the map information storage unit 231 and the second indication information received by the indication reception unit 212.

The set position transmission unit 215 as an output unit transmits information (absolute position information) regarding the acquisition start position set by the first setting unit 213 and information (absolute position information) regarding the acquisition end position set by the second setting unit 214 to the operation information acquisition device 30 through the communication unit 260. That is, the set position transmission unit 215 as an output unit outputs information regarding the set acquisition start position and acquisition end position to the operation information acquisition device 30.

(Functional Configuration of Operation Information Acquisition Device)

Figure 5:
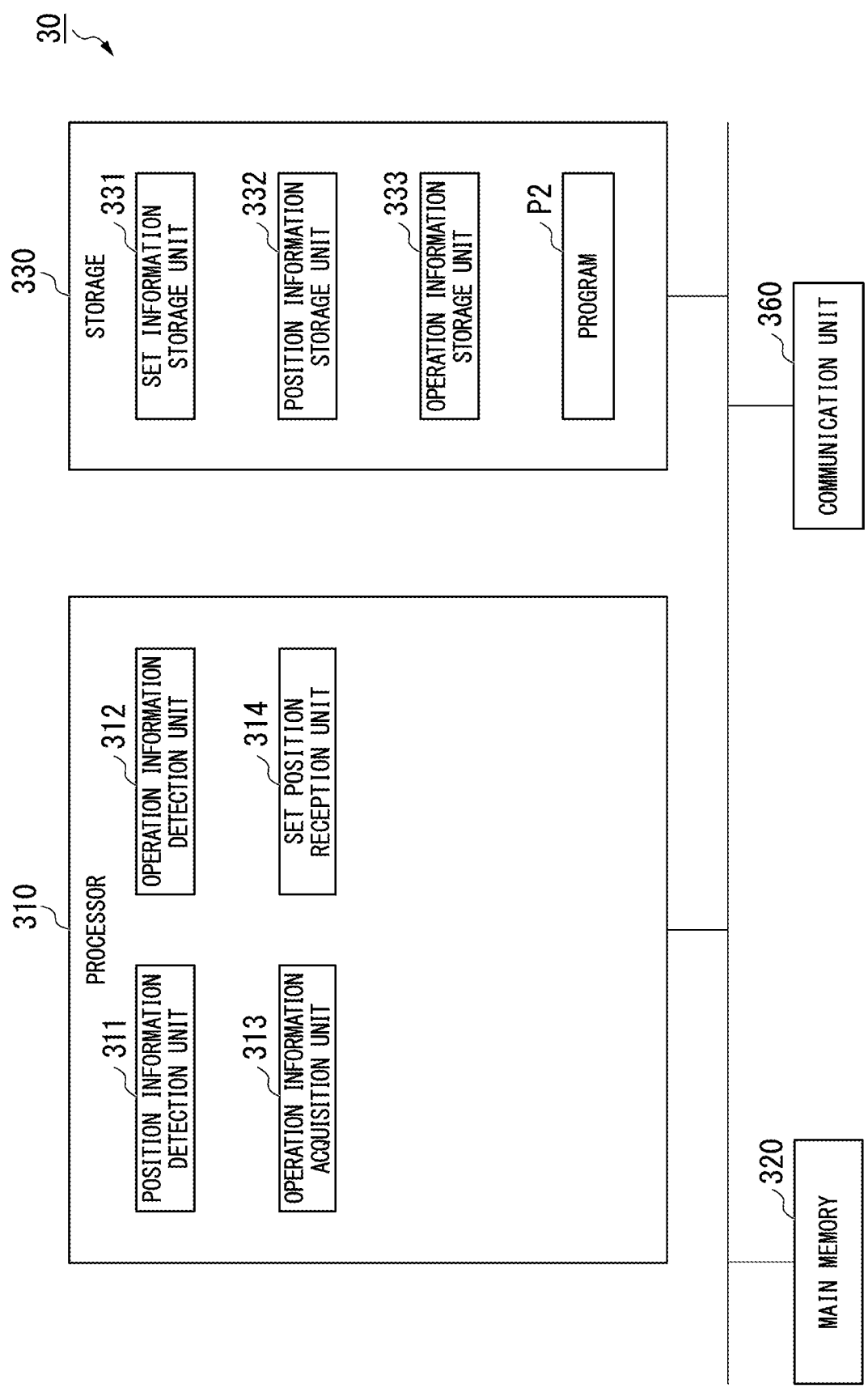
FIG. 5 is a diagram showing the functional configuration of an operation information acquisition device according to the first embodiment.

FIG. 5 is a diagram showing the functional configuration of the operation information acquisition device according to the first embodiment.

The operation information acquisition device 30 acquires the operation information of the work vehicle 3 based on information regarding the acquisition start position and the acquisition end position set using the terminal 20. As shown in FIG. 2, the operation information acquisition device 30 is mounted in the work vehicle 3.

The operation information acquisition device 30 includes a processor 310, a main memory 320, a storage 330, and a communication unit 360.

The processor 310 is a processor that controls the whole operation of the operation information acquisition device 30. Various functions of the processor 310 will be described below.

The main memory 320 is a so-called main storage device. Instructions and data necessary for the processor 310 to operate based on a program are developed to the main memory 320.

The communication unit 360 is a communication interface that is provided for the operation information acquisition device 30 to perform communication with the terminal 20. The communication unit 360 may be, for example, wireless communication instrument, a network card, or the like.

The storage 330 is a so-called auxiliary storage device, and is, for example, a hard disk drive (HDD), a solid state drive (SSD), or the like. The storage 330 stores a program P2. The processor 310 reads the program P2 from the storage 330, develops the program P2 to the main memory 320, and executes processing according to the program P2.

The storage 330 has a storage area as the set information storage unit 331, a position information storage unit 332, and an operation information storage unit 333. In the set information storage unit 331, information regarding the acquisition start position and the acquisition end position set by the terminal 20 is stored. In the position information storage unit 332, the current position information of the work vehicle 3 acquired by a position information detection unit 311 is stored in association with an acquisition time. In the operation information storage unit 333, the operation information of the work vehicle 3 acquired by an operation information acquisition unit 313 is stored in association with the vehicle ID of the work vehicle 3.

The functions of the processor 310 of the operation information acquisition device 30 according to the first embodiment will be described in detail. The processor 310 operates based on the predetermined program P2, thereby exhibiting functions as the position information detection unit 311, an operation information detection unit 312, the operation information acquisition unit 313, and a set position reception unit 314.

The position information detection unit 311 detects the current position of the work vehicle 3 through the position information detection device 31 and outputs the detected current position information of the work vehicle 3 to the operation information acquisition unit 313. The position information detection unit 311 stores the detected current position information of the work vehicle 3 in the position information storage unit 332 in association with an acquisition time.

The operation information detection unit 312 detects the operation information (vibration information, vehicle speed information, fuel efficiency information, posture information, operation signal information, shift stage information, hydraulic pressure information, and weight information) of the work vehicle 3 through the vibration information detection device 32, the vehicle speed information detection device 33, the fuel efficiency information detection device 34, the posture information detection device 35, the operation signal detection device 36, the shift stage information detection device 37, the hydraulic pressure information detection device 38, and the weight information detection device 39, and outputs the detected operation information of the work vehicle 3 to the operation information acquisition unit 313.

The operation information acquisition unit 313 compares the current position information of the work vehicle 3 input from the position information detection unit 311 with information regarding the acquisition start position and the acquisition end position stored in the set information storage unit 331, and in a case where the operation information acquisition unit 313 determines that the work vehicle 3 has passed through the acquisition end position after having passed through the acquisition start position, acquires the operation information from the acquisition start position to the acquisition end position. Specifically, the operation information acquisition unit 313 stores the operation information input from the operation information detection unit 312 in the operation information storage unit 333 in association with a detection time. The operation information acquisition unit 313 may store the operation information classified according to the vehicle ID of the work vehicle 3, the classification of the operation information, the acquisition time period, the set acquisition condition, or the like as necessary.

The set position reception unit 314 receives information regarding the set acquisition start position and acquisition end position from the terminal 20 and stores the received information in the set information storage unit 331. Therefore, it is possible to retrieve the stored operation information later, and to execute evaluation processing of the work vehicle 3.

(Processing of Operation Information Acquisition System)

Figure 6:
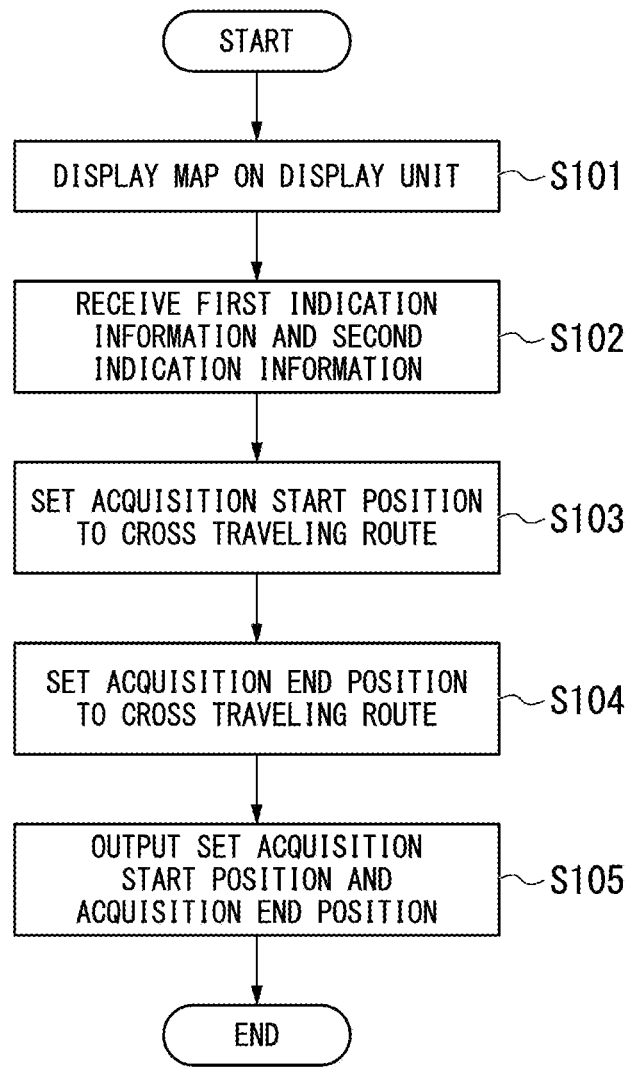
FIG. 6 is a diagram showing a processing flow by the terminal according to the first embodiment.

FIG. 6 is a diagram showing a processing flow by the terminal according to the first embodiment.

Figure 7:
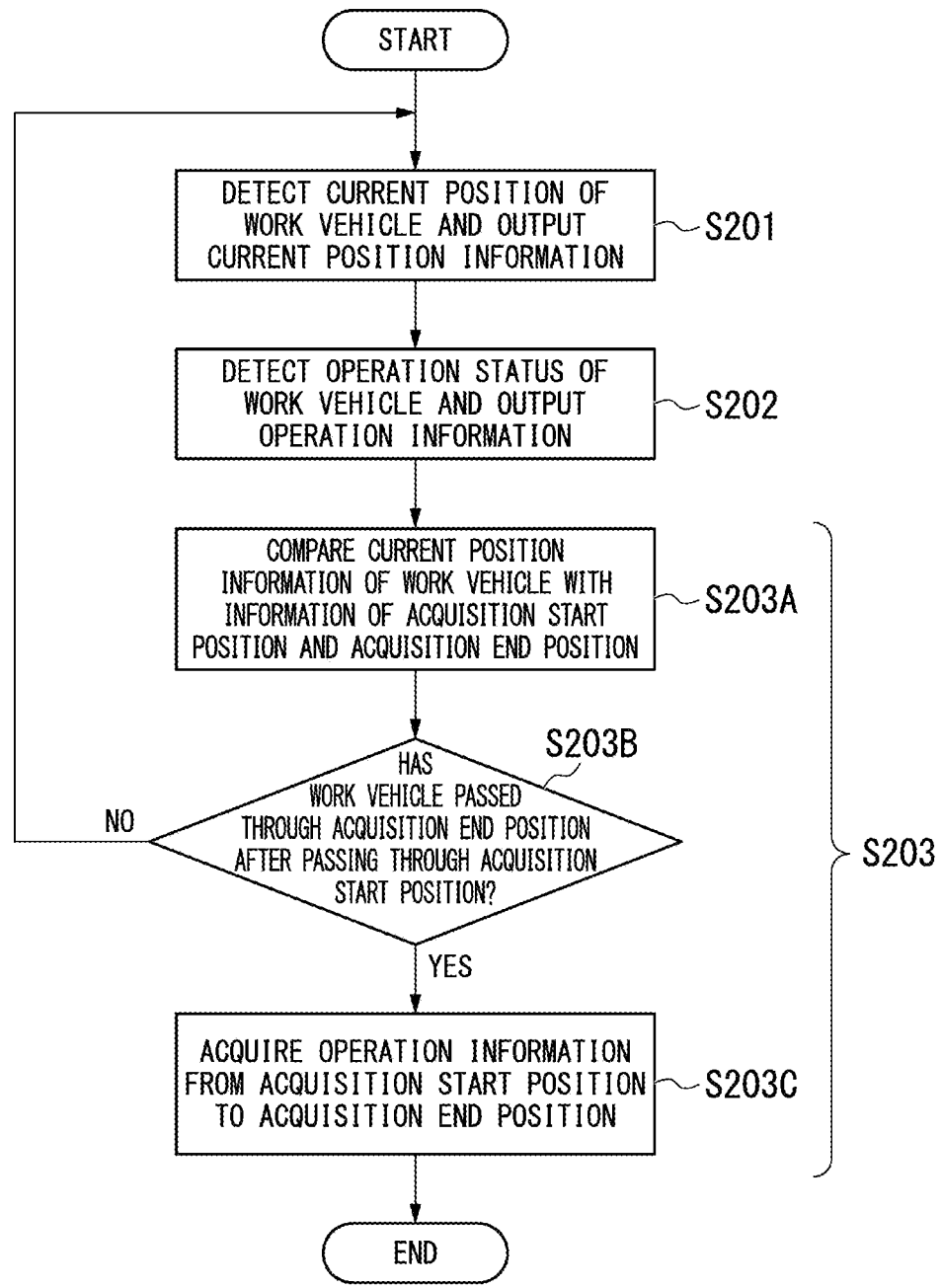
FIG. 7 is a diagram showing a processing flow by the operation information acquisition device according to the first embodiment.

FIG. 7 is a diagram showing a processing flow by the operation information acquisition device according to the first embodiment.

Hereinafter, the flows of processing that are executed by the terminal 20 and the operation information acquisition device 30 of the operation information acquisition system 1 will be described referring to FIGS. 6 and 7.

In the operation information acquisition system 1, in the processing flow shown in FIG. 6, the terminal 20 sets the acquisition start position and the acquisition end position on the operation information of the work vehicle 3, and based on the set acquisition start position and acquisition end position, in the processing flow shown in FIG. 7, the operation information acquisition device 30 acquires the operation information.

(Processing Flow of Terminal)

The processing flow shown in FIG. 6 is started when an application dedicated to the terminal 20 is activated by the inputter in the management office C.

In a case where the dedicated application is activated by the inputter in the management office C, the display control unit 211 of the processor 210 reads the map information from the map information storage unit 231 and displays the map on the display unit 250 based on the map information (Step S101).

The indication reception unit 212 receives the first indication information indicating, on the map, the acquisition start position where the acquisition of the operation information of the work vehicle 3 starts and the second indication information indicating, on the map, the acquisition end position where the acquisition of the operation information ends (Step S102). As described referring to FIG. 4, the inputter in the management office C touches the two different points on the map displayed on the display unit 250 in turn to input the first indication information (T1, T2). Next, the inputter further touches the two different points on the map displayed on the display unit 250 in turn to input the second indication information (T3, T4).

The first setting unit 213 sets the acquisition start position to cross the traveling route R based on the map information read from the map information storage unit 231 and the first indication information received by the indication reception unit 212 (Step S103). In the case shown in FIG. 4, the first setting unit 213 calculates absolute positions (U1, U2) on the absolute coordinates corresponding to information (T1, T2) regarding the two positions on the map included in the first indication information based on the absolute position information associated with the map information. Next, the first setting unit 213 calculates a line segment on the absolute coordinates with the two absolute positions (U1, U2) on the absolute coordinates as end points and sets the line segment (line segment area) as the acquisition start position. Hereinafter, for convenience of description, the line segment on the absolute coordinates to be the acquisition start position is expressed as (U1U2).

The first setting unit 213 sets the acquisition start position after performing position adjustment based on the map information such that the acquisition start position (U1U2) becomes a line segment over the total length of the traveling route R in a transverse direction (width direction).

In the first embodiment, although the first setting unit 213 sets the line segment area of the line segment with the two absolute positions (TA1, TA2) on the absolute coordinates as end points as the acquisition start position, in other embodiments, the acquisition start position may be set through other kinds of processing.

The second setting unit 214 sets the acquisition start position to cross the traveling route R based on the map information read from the map information storage unit 231 and the second indication information received by the indication reception unit 212 (Step S104). In the case shown in FIG. 4, the second setting unit 214 calculates absolute positions (U3, U4) on the absolute coordinates corresponding to information (T3, T4) regarding the two positions on the map included in the second indication information based on the absolute position information associated with the map information. Next, the second setting unit 214 calculates a line segment on the absolute coordinates with the two absolute positions (U3, U4) on the absolute coordinates as end points and sets the line segment (line segment area) as the acquisition end position. Hereinafter, for convenience of description, the line segment on the absolute coordinates to be the acquisition end position is expressed as (U3U4).

The second setting unit 214 sets the acquisition end position after performing position adjustment based on the map information such that the acquisition end position (U3U4) becomes a line segment over the total length of the traveling route R in the transverse direction (width direction).

In the first embodiment, although the second setting unit 214 sets the line segment area of the line segment with the two absolute positions (TA3, TA4) on the absolute coordinates as end points as the acquisition end position, in other embodiments, the acquisition end position may be set through other kinds of processing.

The set position transmission unit 215 as an output unit outputs information regarding the set acquisition start position and acquisition end position to the operation information acquisition device 30 (Step S105). Specifically, the set position transmission unit 215 as an output unit transmits information (absolute position information) regarding the acquisition start position (U1U2) set by the first setting unit 213 and information (absolute position information) regarding the acquisition end position (U3U4) set by the second setting unit 214 to the operation information acquisition device 30 through the communication unit 260.

With the above, the processing flow shown in FIG. 6 ends.

(Processing Flow of Operation Information Acquisition Device)

The processing flow shown in FIG. 7 is started, for example, at a timing at which the set position reception unit 314 of the processor 310 receives information regarding the set acquisition start position and acquisition end position from the terminal 20 and stores the received information in the set information storage unit 331 in a state in which an application dedicated to the operation information acquisition device 30 is activated.

In a case where information regarding at least one set or more of set acquisition start positions and acquisition end positions are stored in advance in the set information storage unit 331, the processing flow shown in FIG. 7 may be started when the worker (driver) of the work vehicle 3 activates the application dedicated to the operation information acquisition device 30.

In a case where the dedicated application is activated, the position information detection unit 311 of the processor 310 detects the current position of the work vehicle 3 through the position information detection device 31 and outputs the detected current position information of the work vehicle 3 to the operation information acquisition unit 313 (Step S201). The position information detection unit 311 stores the detected current position information of the work vehicle 3 in the position information storage unit 332 in association with an acquisition time.

The operation information detection unit 312 detects the operation information (vibration information, vehicle speed information, fuel efficiency information, posture information, operation signal information, shift stage information, hydraulic pressure information, and weight information) of the work vehicle 3 through the vibration information detection device 32, the vehicle speed information detection device 33, the fuel efficiency information detection device 34, the posture information detection device 35, the operation signal detection device 36, the shift stage information detection device 37, the hydraulic pressure information detection device 38, and the weight information detection device 39, and outputs the detected operation information of the work vehicle 3 to the operation information acquisition unit 313 (Step S202).

The operation information acquisition unit 313 compares the current position information of the work vehicle 3 input from the position information detection unit 311 with information regarding the acquisition start position and the acquisition end position stored in the set information storage unit 331, and in a case where the operation information acquisition unit 313 determines that the work vehicle 3 has passed through the acquisition end position after having passed through the acquisition start position, acquires the operation information from the acquisition start position to the acquisition end position (Step S203).

The details of each of processing (Steps S203A to S203C) constituting Step S203 will be described. In Step S203A, the operation information acquisition unit 313 compares the current position information of the work vehicle 3 input from the position information detection unit 311 with information regarding the acquisition start position and the acquisition end position stored in the set information storage unit 331 (Step S203A).

A procedure for comparing the current position information of the work vehicle 3 with information regarding the acquisition start position will be specifically described. The operation information acquisition unit 313 refers to the position information storage unit 332 and acquires the current position information (hereinafter, referred to as last position information) of the work vehicle 3 last stored by the position information detection unit 311. The operation information acquisition unit 313 calculates a line segment (a line segment on the absolute coordinates) connecting the last position and the current position of the work vehicle 3 based on the acquired last position information and the input current position information. The operation information acquisition unit 313 refers to the set information storage unit 331 and acquires information (the line segment on the absolute coordinates) regarding the set acquisition start position. The operation information acquisition unit 313 determines that the work vehicle 3 has passed through the acquisition start position in a case where the calculated line segment intersects the set line segment (information regarding the acquisition start position).

The same applies to a procedure for comparing the current position information of the work vehicle 3 with information regarding the acquisition end position. The operation information acquisition unit 313 refers to the set information storage unit 331 and acquires information (the line segment on the absolute coordinates) regarding the set acquisition end position. The operation information acquisition unit 313 determines that the work vehicle 3 has passed through the acquisition end position in a case where the calculated line segment intersects the set line segment (information regarding the acquisition end position).

In Step S203B, the operation information acquisition unit 313 determines whether or not the work vehicle 3 has passed through the acquisition end position after having passed through the acquisition start position. With the above-described procedures, in a case where the operation information acquisition unit 313 determines that the work vehicle 3 has passed through both of the acquisition start position and the acquisition end position, and in a case where a time at which the work vehicle 3 has passed through the acquisition end position is later than a time at which the work vehicle 3 has passed through the acquisition start position, the operation information acquisition unit 313 determines that the work vehicle 3 has passed through the acquisition end position after having passed through the acquisition start position. The time at which the work vehicle 3 has passed through the acquisition start position and the time at which the work vehicle 3 has passed through the acquisition end position are the acquisition time associated with the current position information used in respective determination.

In Step S203C, the operation information acquisition unit 313 acquires the operation information from the acquisition start position to the acquisition end position.

Specifically, the operation information acquisition unit 313 starts storage of the operation information input from the operation information detection unit 312 in the operation information storage unit 333 when the operation information acquisition unit 313 determines that the work vehicle 3 has passed through the acquisition start position, and ends the storage of the operation information input from the operation information detection unit 312 in the operation information storage unit 333 when d the operation information acquisition unit 313 determines that the work vehicle 3 has passed through the acquisition end position.

In the first embodiment, in a case where the work vehicle 3 has not passed through the acquisition end position even though a predetermined time defined in advance has elapsed from the start of the storage of the operation information in the operation information storage unit 333, the operation information acquisition unit 313 stops the storage in the operation information storage unit 333 and deletes, from the operation information storage unit 333, all pieces of operation information stored from when the work vehicle 3 has passed through the acquisition start position.

In the first embodiment, although a case where the operation information acquisition unit 313 starts the storage of the operation information in the operation information storage unit 333 when the operation information acquisition unit 313 determines that the work vehicle 3 has passed through the acquisition start position has been described, in other embodiments, the operation information may be stored in the operation information storage unit 333 when the operation information acquisition unit 313 determines that the work vehicle 3 has passed through both of the acquisition start position and the acquisition end position. In this case, for example, the operation information acquisition unit 313 may temporarily store all pieces of operation information input from the operation information detection unit 312 buffer (for example, the main memory or the like), may extract only the operation information from the acquisition start position to the acquisition end position from the buffer later, and may store the extracted operation information in the operation information storage unit 333.

With the above, the processing flow shown in FIG. 7 ends.

Setting Examples

FIGS. 8 to 14 are diagrams showing first to six acquisition examples of the operation information according to the first embodiment.

Hereinafter, a specific acquisition example of operation information by the operation information acquisition system 1 according to the first embodiment will be described in detail referring to FIGS. 8 to 15.

First Acquisition Example

Figure 8:
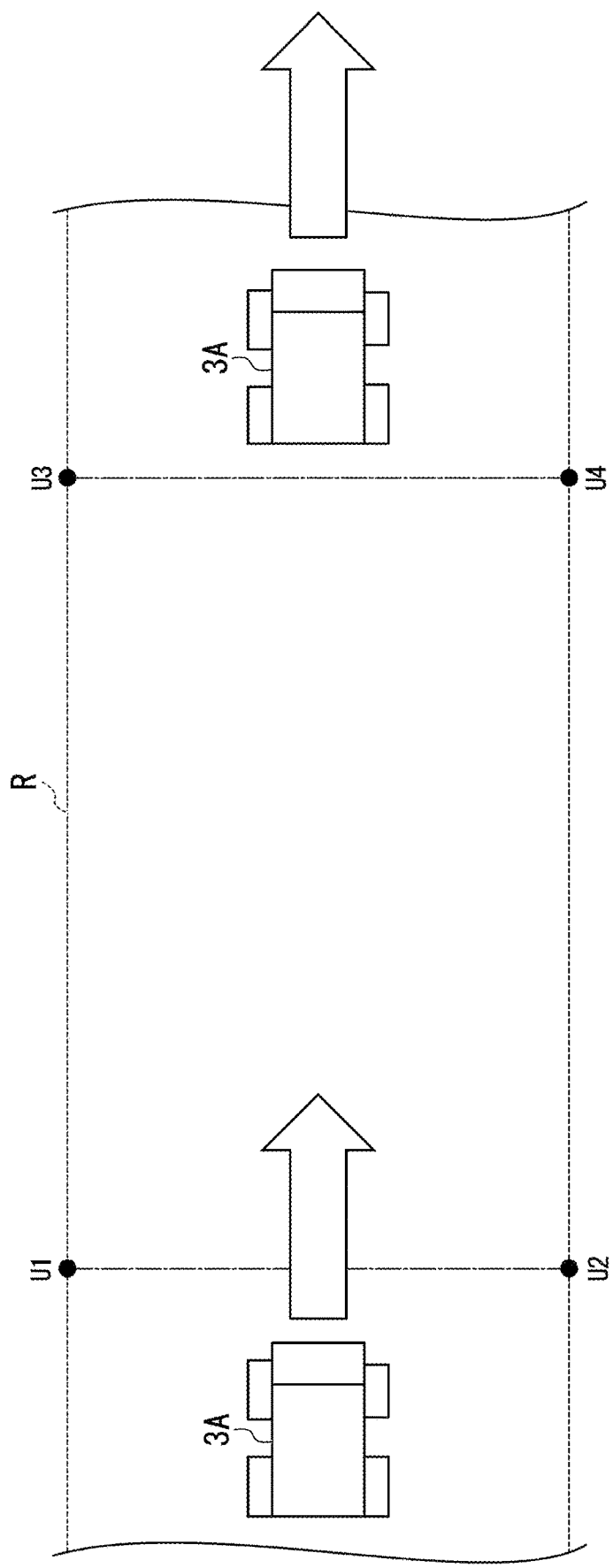
FIG. 8 is a first view showing a first acquisition example of operation information according to the first embodiment.
Figure 9:
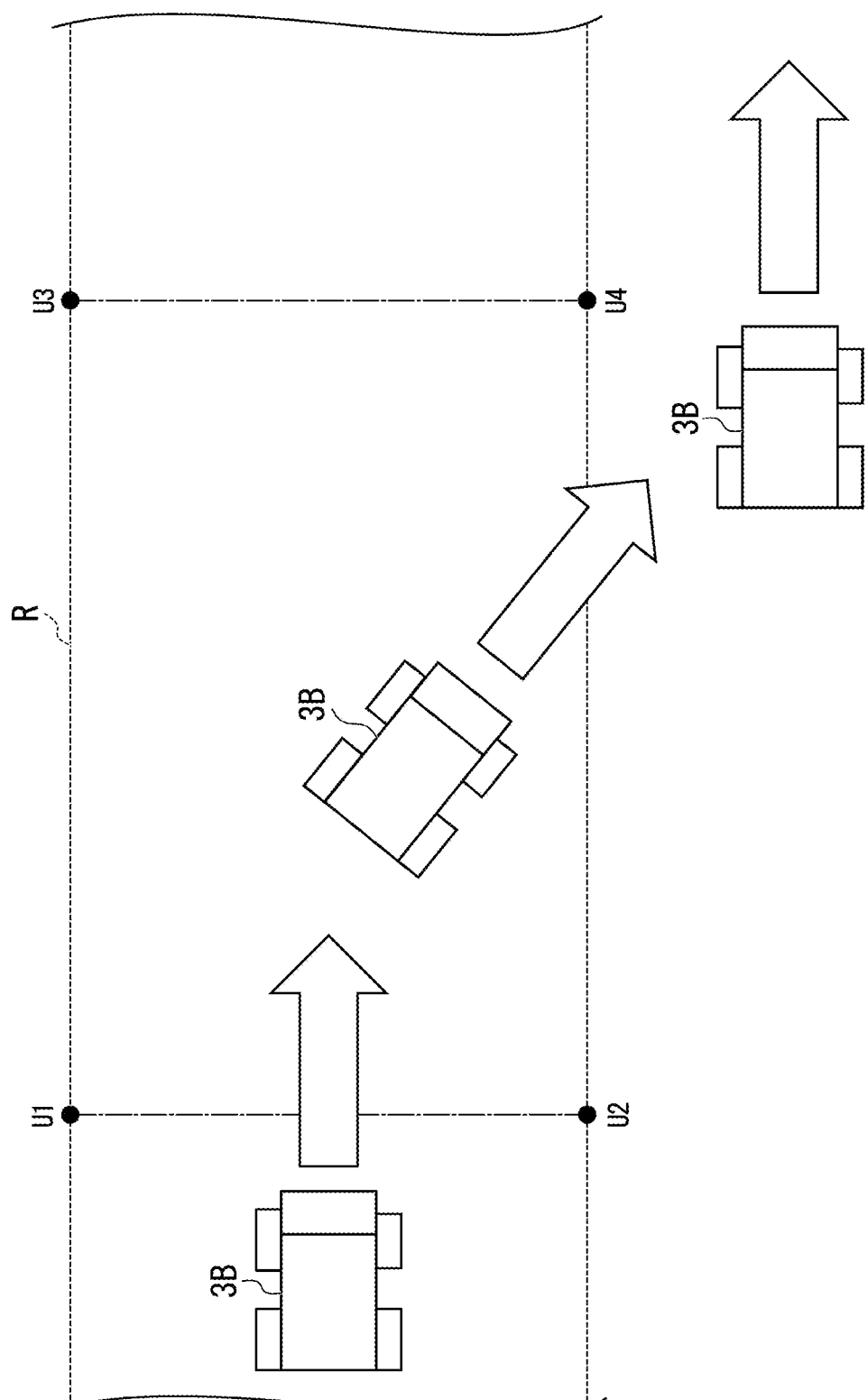
FIG. 9 is a second view showing the first acquisition example of the operation information according to the first embodiment.

FIGS. 8 and 9 are first and second views showing a first acquisition example of operation information according to the first embodiment. The first acquisition example is an acquisition example of the operation information of the work vehicle 3 in a case where the inputter inputs the first indication information (T1, T2) and the second indication information (T3, T4) using the terminal 20 as shown in FIG. 4.

As shown in FIGS. 8 and 9, an acquisition start position (U1U2) corresponding to information (T1, T2) regarding positions on the map is set by the first setting unit 213 of the terminal 20. An acquisition end position (U3U4) corresponding to information (T3, T4) regarding positions on the map is set by the second setting unit 214 of the terminal 20. It is assumed that information regarding the set acquisition start position (U1U2) and acquisition end position (U3U4) is stored in the set information storage unit 331 of the operation information acquisition device 30.

As shown in FIG. 8, in a case where a work vehicle 3A travels on a traveling route R in a direction of an arrow, passes through the acquisition start position (U1U2), and then, passes through the acquisition end position (U3U4), the operation information acquisition device 30 acquires operation information of the work vehicle 3A from the acquisition start position (U1U2) to the acquisition end position (U3U4) according to the processing flow shown in FIG. 7.

On the other hand, as shown in FIG. 9, in a case where a work vehicle 3B travels on the traveling route R in the direction of the arrow, passes through the acquisition start position (U1U2), then, changes a moving direction, and does not pass through the acquisition end position (U3U4), the operation information acquisition device 30 does not acquire the operation information of the work vehicle 3A from the acquisition start position (U1U2) to the acquisition end position (U3U4) according to the processing flow shown in FIG. 7.

Second Acquisition Example

Figure 10:
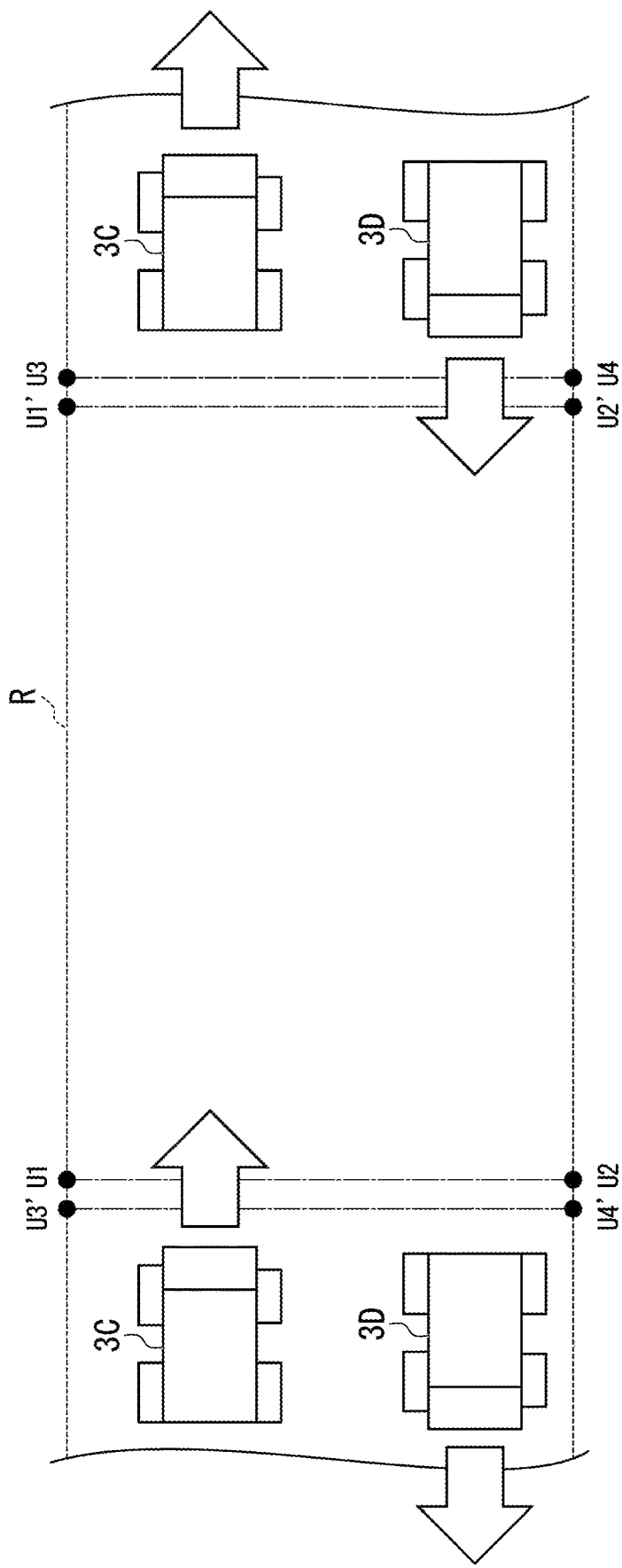
FIG. 10 is a diagram showing a second acquisition example of operation information according to the first embodiment.

FIG. 10 is a diagram showing a second acquisition example of operation information according to the first embodiment.

In the above-described first acquisition example, although a case where one set of the acquisition start position and the acquisition end position is set using the terminal has been described, the number of acquisition start positions and the number of acquisition end positions set using the terminal 20 may be two or more.

In the second acquisition example, as shown in FIG. 10, an acquisition start positions (U1U2) is set by the first setting unit 213 of the terminal 20. An acquisition end position (U3U4) is set by the second setting unit 214 of the terminal 20.

In addition, an acquisition start position (U1'U2') is set by the first setting unit 213 of the terminal 20. An acquisition end position (U3'U4') is set by the second setting unit 214 of the terminal 20.

As shown in FIG. 10, the acquisition start position (U1U2) is set as the same position as the acquisition end position (U3'U4'), and the acquisition end position (U3U4) is set at the same position as the acquisition start position (U1'U2'). In FIG. 10, the acquisition start position and the acquisition end position that are set at the same position are shown displaced from each other in consideration of easiness of viewing.

It is assumed that information regarding the set acquisition start position (U1U2), acquisition end position (U3U4), acquisition start position (U1'U2'), and acquisition end position (U3 'U4') is stored in the set information storage unit 331 of the operation information acquisition device 30.

As shown in FIG. 10, in a case where a work vehicle 3C travels on a traveling route R in a direction of an arrow, passes through the acquisition start position (U1U2), and then, passes through the acquisition end position (U3U4), the operation information acquisition device 30 acquires operation information of the work vehicle 3C from the acquisition start position (U1U2) to the acquisition end position (U3U4) according to the processing flow shown in FIG. 7.

Similarly, as shown in FIG. 10, in a case where a work vehicle 3D travels on the traveling route R in a direction of an arrow, passes through the acquisition start position (U1'U2'), and then, passes through the acquisition end position (U3 'U4'), the operation information acquisition device 30 acquires operation information of the work vehicle 3D from the acquisition start position (U1'U2') to the acquisition end position (U3'U4') according to the processing flow shown in FIG. 7.

In the second acquisition example, the positional relationships of the two sets of the acquisition start positions and the acquisition end positions are reversed, and the acquisition start positions and the acquisition end positions are set at the same positions. Thereby, for the same range on the traveling route R, it is possible to acquire the operation information in both cases of a case where the work vehicle 3 travels in a forward direction (a direction from left to right in FIG. 10) and a case where the work vehicle 3 travels in a backward direction (a direction from right to left in FIG. 10).

In the second acquisition example, the work vehicle 3C and the work vehicle 3D shown in FIG. 10 may be different work vehicles 3 or may be the same work vehicle 3. For example, there is a case where the work vehicle 3D and the work vehicle 3C are the same work vehicle 3, and the same worker drives the work vehicle 3 on the traveling route R shown in FIG. 10. In addition, there is a case where the traveling route R shown in FIG. 10 is an uphill road having a gradient. In such a case, it is possible to acquire and compare the operation information when the work vehicle 3 that is driven by the worker ascends the uphill road and the operation information when the work vehicle 3 descends the uphill road.

Third Acquisition Example

Figure 11:
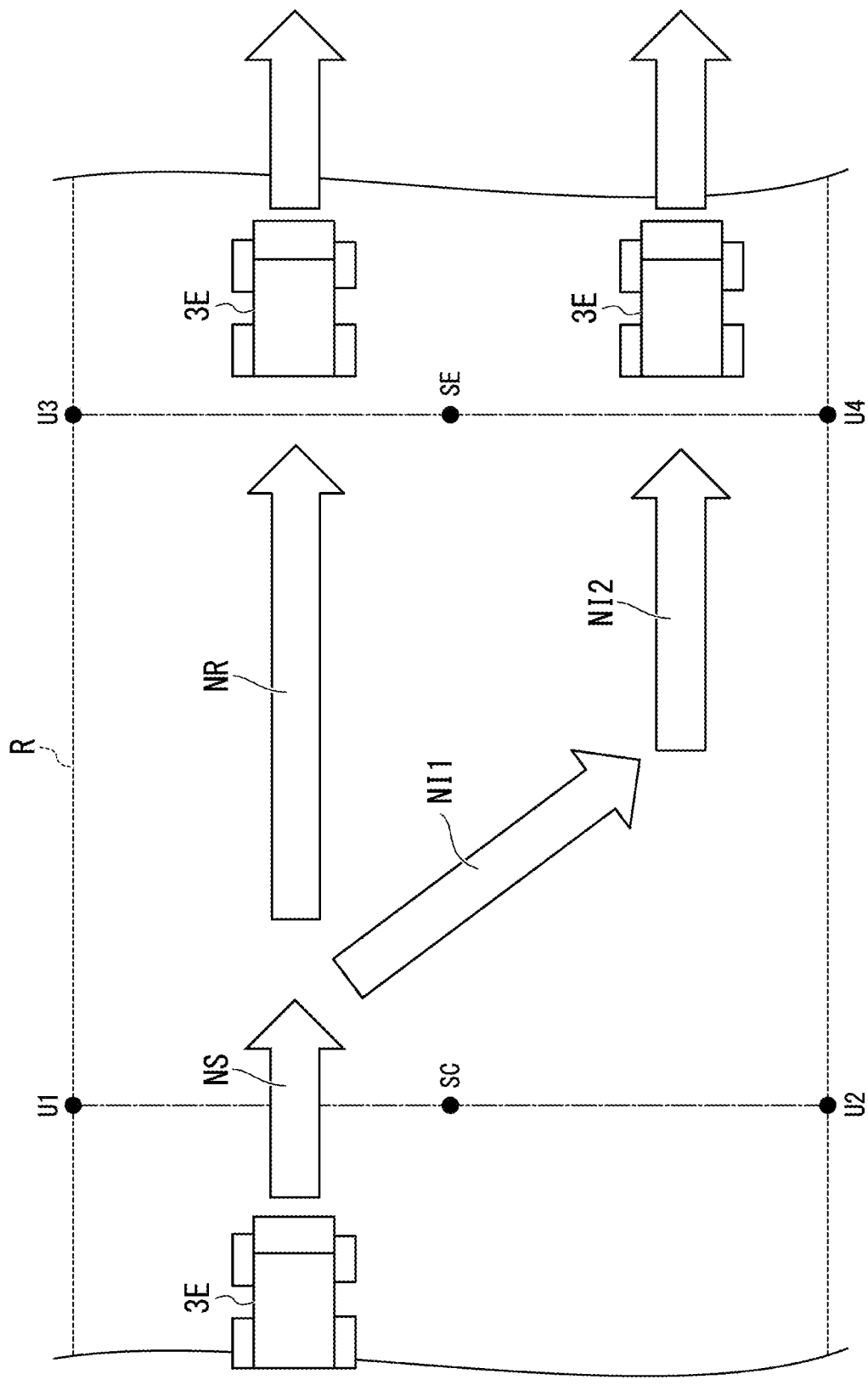
FIG. 11 is a diagram showing a third acquisition example of operation information according to the first embodiment.

FIG. 11 is a diagram showing a third acquisition example of operation information according to the first embodiment.

In the above-described first and second acquisition examples, although a case where the acquisition start position and the acquisition end position set using the terminal are set over the total length of the traveling route R in the transverse direction (width direction) has been described, the acquisition start position and the acquisition end position set using the terminal 20 may be set in part of the transverse direction.

In the third acquisition example, as shown in FIG. 11, in addition to an acquisition start position (U1U2), an intermediate start position (SC) is set by the first setting unit 213 of the terminal 20. The intermediate start position (SC) may be, for example, an intermediate position, such as a center position on a traveling route R in the transverse direction or a position in the vicinity of the center position, in the acquisition start position (U1U2).

Similarly, in the third acquisition example, as shown in FIG. 11, in addition to an acquisition end position (U3U4), an intermediate end position (SE) is set by the second setting unit 214 of the terminal 20. The intermediate end position (SE) may be, for example, an intermediate position, such as a center position of the traveling route R in the transverse direction or a position in the vicinity of the center position, in the acquisition end position (U3U4).

It is assumed that information regarding the set acquisition start position (U1U2), acquisition end position (U3U4), intermediate start position (SC), and intermediate end position (SE) is stored in the set information storage unit 331 of the operation information acquisition device 30.

In the third acquisition example, for example, the operation information acquisition unit 313 changes the acquisition start position (U1U2) and the acquisition end position (U3U4), and acquires operation information. Specifically, the operation information acquisition unit 313 uses an acquisition start position (U1SC) that is a line segment (line segment area) with the position (U1) and the intermediate start position (SC) as end points, instead of the acquisition start position (U1U2). Furthermore, the operation information acquisition unit 313 uses an acquisition end position (U3SE) that is a line segment (line segment area) with the position (U3) and the intermediate end position (SE) as end points, instead of the acquisition end position (U3U4). In the third acquisition example, although the acquisition start position and the acquisition end position are reduced to the position (U1) side and the position (U3) side on an assumption that a work vehicle 3E travels on the traveling route R while keeping to the left, for example, the acquisition start position and the acquisition end position may be reduced to the position (U2) side the position (U4) side. In addition, a plurality of intermediate start positions may be set.

As shown in FIG. 11, in a case where the work vehicle 3E travels on the traveling route R in a direction from an arrow NS to an arrow NR, passes through the acquisition start position (U1SC), and then, passes through the acquisition end position (U3SE), the operation information acquisition device 30 acquires operation information of the work vehicle 3E from the acquisition start position (U1SC) to the acquisition end position (U3SE) according to the processing flow shown in FIG. 7. For example, in a case where the work vehicle 3 travels on the traveling route R without passing another work vehicle 3, it is assumed that the work vehicle 3 passes through the acquisition end position (U3SE) after passing through the acquisition start position (U1SC).

On the other hand, as shown in FIG. 11, in a case where the work vehicle 3E travels on the traveling route R in a direction from an arrow NS to an arrow NI1 and an arrow NI2, passes through the acquisition start position (U1SC), and then, does not pass through the acquisition end position (U3SE), the operation information acquisition device 30 does not acquire operation information of the work vehicle 3E. For example, in a case where the work vehicle 3 travels on the traveling route R while passing another work vehicle 3, it is assumed that the work vehicle 3 does not pass through the acquisition end position (U3SE) after passing through the acquisition start position (U1SC).

In the third acquisition example, the acquisition start position and the acquisition end position set using the terminal 20 are set in part of the transverse direction, whereby it is possible to acquire only the operation information of the work vehicle 3E in a case where there is no passing or the like on the traveling route R capable of allowing two-way traffic, for example. Therefore, for example, in a case where an acquisition amount of the operation information from the acquisition start position (U1SC) to the acquisition end position (U3SE) is small in an evaluation result of the acquired operation information, it is presumed that passing frequently occurs in a traveling area from the acquisition start position (U1SC) to the acquisition end position (U3SE). Accordingly, it is possible to prompt improvement of traveling road design or operation contents of a mine based on a presumption result, and to achieve improvement of safety of the mine.

Fourth Acquisition Example

Figure 12:
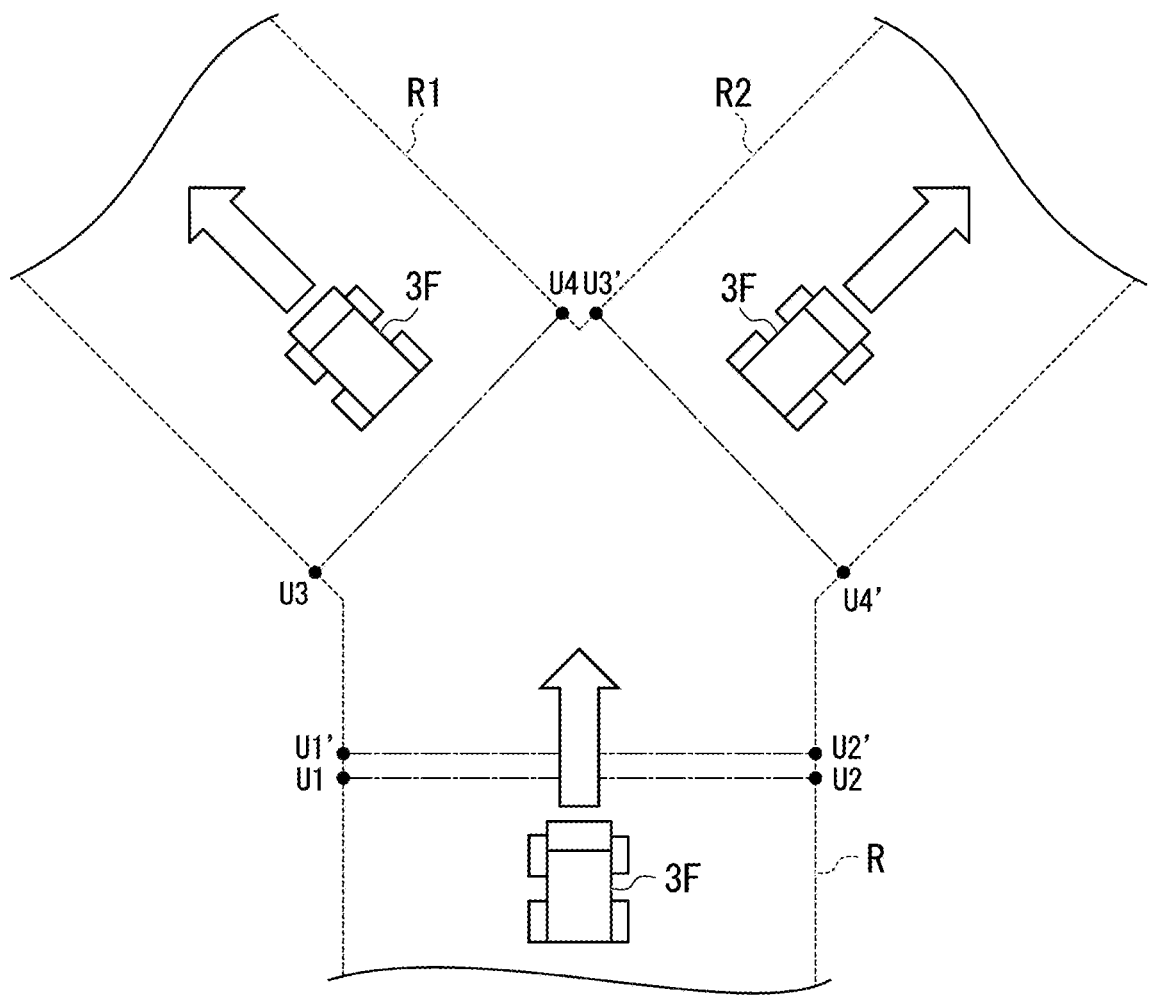
FIG. 12 is a diagram showing a fourth acquisition example of operation information according to the first embodiment.

FIG. 12 is a diagram showing a fourth acquisition example of operation information according to the first embodiment.

The fourth acquisition example is an acquisition example where acquisition start positions and acquisition end positions are set at a junction where a traveling route R branches into a traveling route R1 and a traveling route R2 as shown in FIG. 12.

In the fourth acquisition example, as shown in FIG. 12, in order to acquire operation information of a work vehicle 3F that travels from the traveling route R to the traveling route R1, an acquisition start position (U1U2) is set by the first setting unit 213 of the terminal 20, and an acquisition end position (U3U4) is set by the second setting unit 214. In addition, in order to acquire operation information of the work vehicle 3F that travels from the traveling route R to the traveling route R2, an acquisition start position (U1'U2') is set by the first setting unit 213 of the terminal 20, and an acquisition end position (U3'U4') is set by the second setting unit 214.

As shown in FIG. 12, the acquisition start position (U1U2) is set at the same position as the acquisition start position (U1'U2'). In FIG. 12, the acquisition start positions that are set at the same position are shown displaced from each other in consideration of easiness of viewing.

It is assumed that information regarding the set acquisition start position (U1U2), acquisition end position (U3U4), acquisition start position (U1'U2'), and acquisition end position (U3 'U4') is stored in the set information storage unit 331 of the operation information acquisition device 30.

As shown in FIG. 12, in a case where the work vehicle 3F travels from the traveling route R to the traveling route R1, passes through the acquisition start position (U1U2), and then, passes through the acquisition end position (U3U4), the operation information acquisition device 30 acquires operation information of the work vehicle 3F from the acquisition start position (U1U2) to the acquisition end position (U3U4) according to the processing flow shown in FIG. 7.

Similarly, as shown in FIG. 12, in a case where the work vehicle 3F travels from the traveling route R to the traveling route R2, passes through the acquisition start position (U1'U2'), and then, passes through the acquisition end position (U3'U4'), the operation information acquisition device 30 acquires operation information of the work vehicle 3F from the acquisition start position (U1'U2') to the acquisition end position (U3'U4') according to the processing flow shown in FIG. 7.

In the fourth acquisition example, it is possible to individually acquire the operation information of the work vehicle 3F in a case of traveling from the traveling route R to the traveling route R1 at the junction and the operation information of the work vehicle 3F in a case of traveling from the traveling route R to the traveling route R2 at the junction. For example, in a case where there is a dumping site of a product when the work vehicle 3 moves from the traveling route R to the traveling route R1 at the junction, and there is a dumping site of an overburden when the work vehicle 3 moves to the traveling route R2 at the junction, or the like, it is possible to individually acquire the operation information of the work vehicle 3 according to a destination. Accordingly, it is possible to individually acquire the operation information of the work vehicle 3 according to the destination of the work vehicle 3, and to efficiently and accurately evaluate the operation information.

Fifth Acquisition Example

Figure 13:
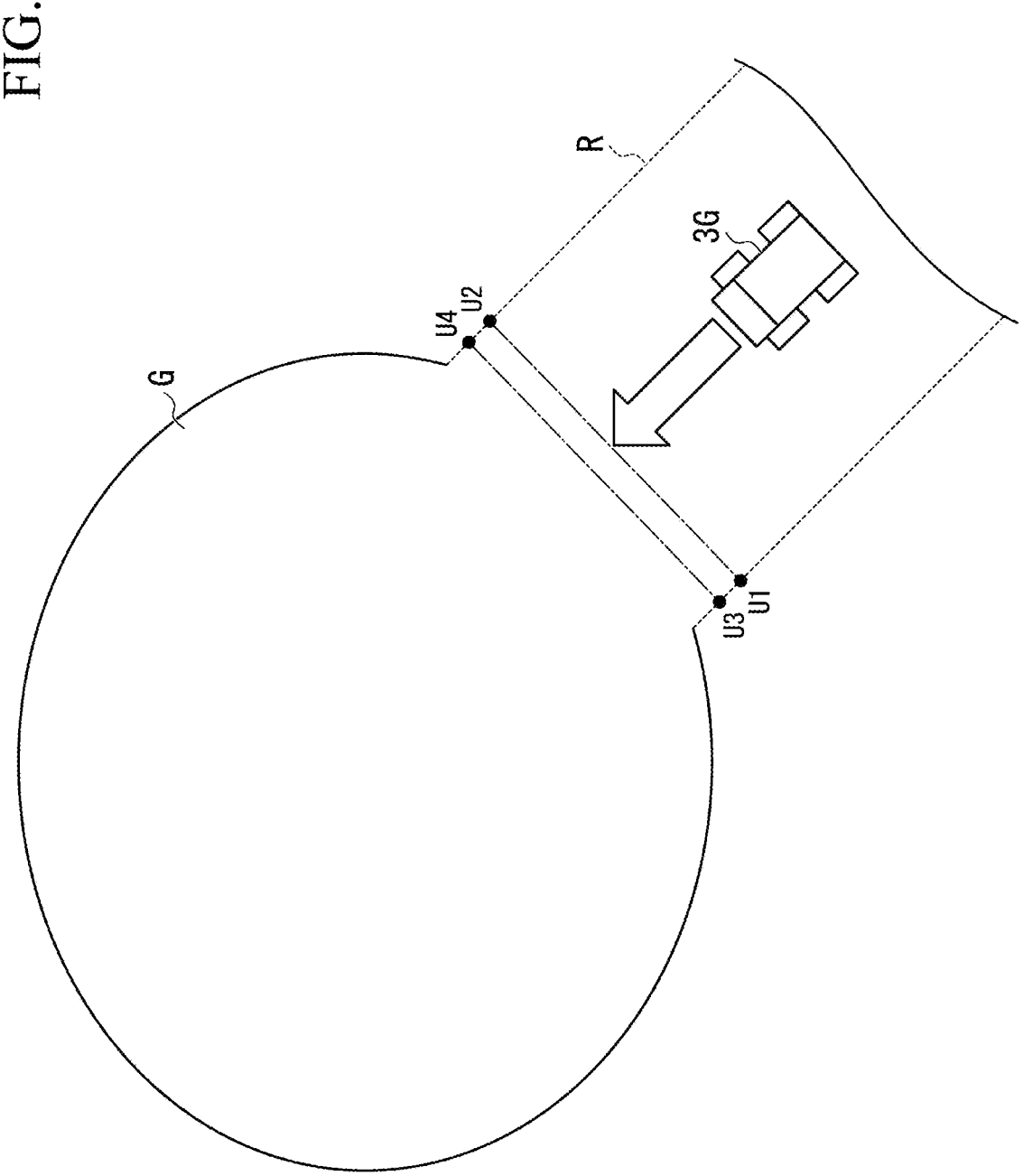
FIG. 13 is a diagram showing a fifth acquisition example of operation information according to the first embodiment.

FIG. 13 is a diagram showing a fifth acquisition example of operation information according to the first embodiment.

In the above-described first to fourth acquisition examples, although a case where the acquisition start position and the acquisition end position of the operation information set using the terminal 20 are set at different positions, the acquisition start position and the acquisition end position of the operation information may be set at the same position.

In the fifth acquisition example, as shown in FIG. 13, an acquisition start position (U1U2) and an acquisition end position (U3U4) are set at an entrance of a loading site G that is a predetermined area connected to the traveling route R.

As shown in FIG. 13, in a case where the work vehicle 3G travels on a traveling route R in a direction of an arrow, passes through the acquisition start position (U1U2), then, enters the loading site G, loads earth in the loading site G, and then, passes through the acquisition end position (U3U4), the operation information acquisition device 30 acquires operation information from when the work vehicle 3G enters the loading site G until the work vehicle 3G leaves the loading site G (that is, operation information from the acquisition start position (U1U2) to the acquisition end position (U3U4)).

In the fifth acquisition example, the acquisition start position and the acquisition end position of the operation information set using the terminal 20 are set at the same position, whereby it is possible to acquire the operation information of the work vehicle 3G that has worked in a work site, such as the loading site G. Since the detection time is included in the operation information, it is possible to evaluate a loading waiting time of the work vehicle 3G that has worked in the work site, such as the loading site G.

Sixth Acquisition Example

Figure 14:
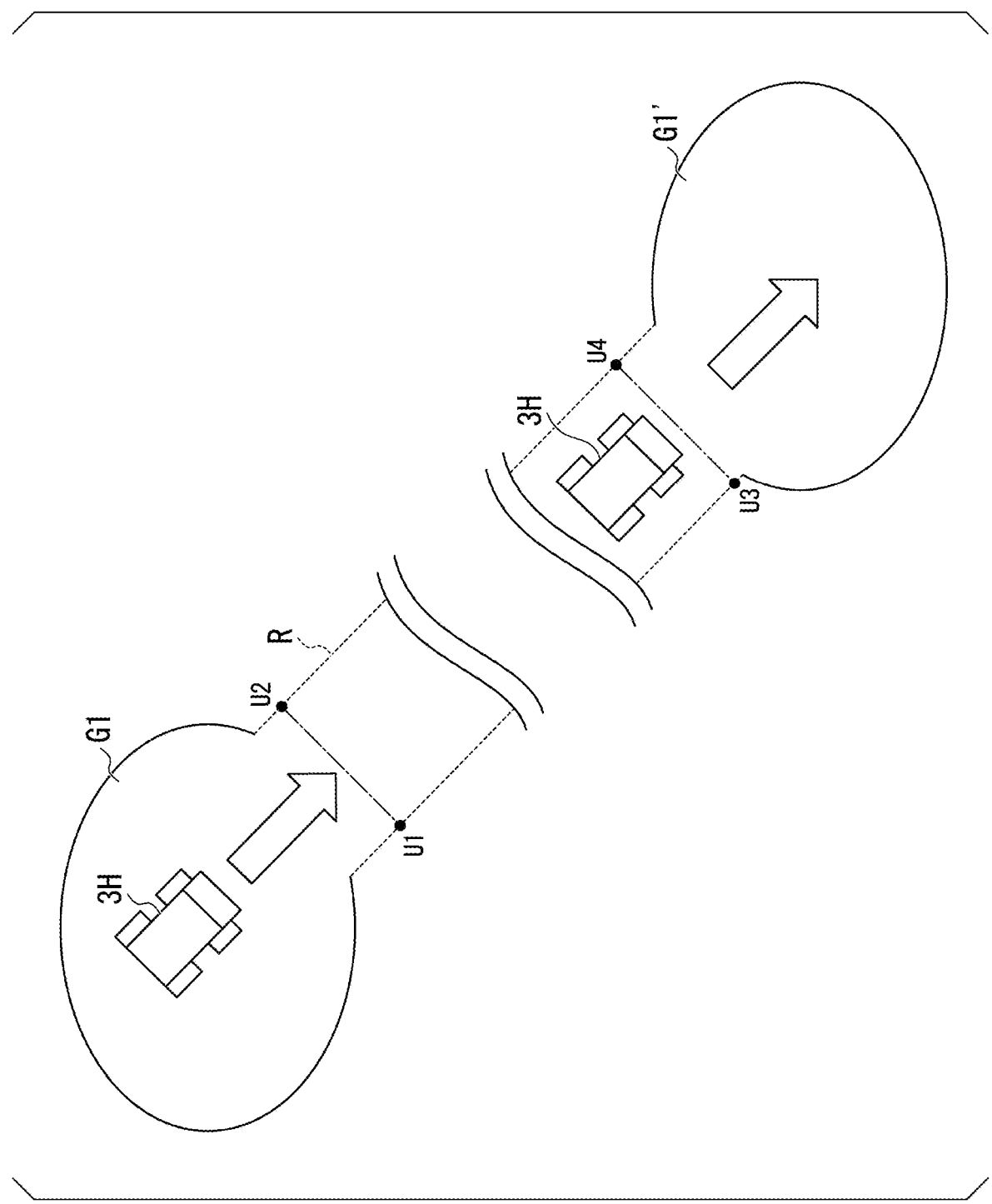
FIG. 14 is a diagram showing a sixth acquisition example of operation information according to the first embodiment.

FIG. 14 is a diagram showing a sixth acquisition example of operation information according to the first embodiment.

In the sixth acquisition example, as shown in FIG. 14, an acquisition start position (U1U2) is set at an entrance of a loading site G1 that is a predetermined area connected to a traveling route R, and an acquisition end position (U3U4) is set at an entrance of a loading site G1' that is a predetermined area connected to the traveling route R.

As shown in FIG. 14, in a case where a work vehicle 3H leaves the loading site G1 in a direction of an arrow, travels on the traveling route R, and enters another loading site G1', the work vehicle 3H passes through the acquisition end position (U3U4) after passing through the acquisition start position (U1U2). Accordingly, the operation information acquisition device 30 acquires operation information (that is, operation information from the acquisition start position (U1U2) to the acquisition end position (U3U4)) of the work vehicle 3H between the loading sites G.

In the sixth acquisition example, it is possible to acquire the operation information of the work vehicle 3H in a case where the work vehicle 3H travels from the loading site G1 to the loading site G1'. For example, in a case where there is a hydraulic excavator as a machine that loads earth or the like on the work vehicle 3H, and the hydraulic excavator moves from the loading site G1 to the loading site G1', a dump truck as a predetermined work vehicle 3H can acquire operation information during traveling from the loading site G1 to the loading site G1'.

(Operations and Effects)

As described above, the terminal 20 according to the first embodiment includes the display unit 250, the map information storage unit 231 that stores the map information relating to the map including the traveling route R of the work vehicle 3 in association with the absolute position information, the display control unit 211 that displays the map on the display unit 250, the indication reception unit 212 that receives the first indication information indicating, on the map, the acquisition start position where the acquisition of the operation information of the work vehicle 3 starts and the second indication information indicating, on the map, the acquisition end position where the acquisition of the operation information ends, the first setting unit 213 that sets the acquisition start position to cross the traveling route R based on the map information and the first indication information, the second setting unit 214 that sets the acquisition end position to cross the traveling route R based on the map information and the second indication information, and the output unit (set position transmission unit) 215 that outputs information regarding the set acquisition start position and acquisition end position.

According to the first embodiment, the terminal 20 (operation information acquisition system 1) can extract the operation information to be evaluated in a stage of acquiring the operation information of the work vehicle 3 by setting the acquisition start position and the acquisition end position. According to the first embodiment, since the terminal 20 receives the indication information based on the positions on the map displayed on the display unit 250, the inputter can easily and accurately set the acquisition start position and the acquisition end position. In particular, even though the absolute position information (for example, latitude, longitude, and the like) of the acquisition start position and the acquisition end position to be set is unclear, the inputter can easily and accurately set the acquisition start position and the acquisition end position by referring to the map displayed on the display unit 250.

According to the first embodiment, each of the first indication information and the second indication information includes information regarding the positions of the two or more points on the map. Therefore, it is possible to easily and accurately set the acquisition conditions (acquisition start position and acquisition end position) of the operation information of the work vehicle 3 using the terminal 20.

According to the first embodiment, the map information includes information regarding the predetermined area (loading site, dumping site, or the like) connected to the traveling route R. Therefore, it is possible to set the acquisition conditions (acquisition start position and acquisition end position) of the operation information of the work vehicle 3 for the predetermined area in addition to the traveling route R.

According to the first embodiment, at least one of the acquisition start position and the acquisition end position is set at the entrance of the predetermined area (loading site, dumping site, or the like). Therefore, it is possible to acquire the operation information of the work vehicle 3 for the predetermined area in addition to the traveling route R.

The operation information acquisition device 30 according to the first embodiment is mounted in the work vehicle 3, the storage unit (set information storage unit) 331 that stores information regarding the set acquisition start position and acquisition end position, the position information detection unit 311 that detects the current position of the work vehicle 3 and outputs the current position information, the operation information detection unit 312 that detects the operation information of the work vehicle 3 and outputs the operation information, and the operation information acquisition unit 313 that compares the current position information of the work vehicle 3 with information regarding the acquisition start position and the acquisition end position, and in a case where the operation information acquisition unit 313 determines that the work vehicle 3 has passed through the acquisition end position after having passed through the acquisition start position, acquires the operation information from the acquisition start position to the acquisition end position.

Therefore, it is possible to acquire accurate operation information of the work vehicle 3 based on accurate current position information of the work vehicle 3. For example, it is possible to acquire accurate operation information of the work vehicle 3 based on current position information with accuracy of about several cm. Furthermore, since the operation information is acquired based on the current position information of the work vehicle 3 and the set acquisition conditions (acquisition start position and acquisition end position) of the operation information, it is possible to automate the acquisition of the operation information. In addition, it is possible to acquire the operation information for each classification of the operation information in a stage of acquiring the operation information. Accordingly, it is possible to improve the efficiency of the evaluation processing of the acquired operation information.

According to the first embodiment, since the terminal 20 that sets the acquisition conditions of the operation information and the operation information acquisition device 30 that acquires the operation information are separate devices, the terminal 20 can be provided or disposed at a place (management office C or the like) different from the work vehicle 3 in which the operation information acquisition device 30 is mounted. Therefore, it is possible to set the acquisition conditions of the operation information of the work vehicle 3 in real time at a place where the terminal 20 exists. Accordingly, for example, it is possible to evaluate the operation information acquired by the operation information acquisition device 30, and to set, based on the evaluation result, the acquisition conditions of the operation information instantly from the place where the terminal 20 exists.

Second Embodiment

Next, an operation information acquisition system 1 according to a second embodiment will be described referring to FIG. 15.

Figure 15:
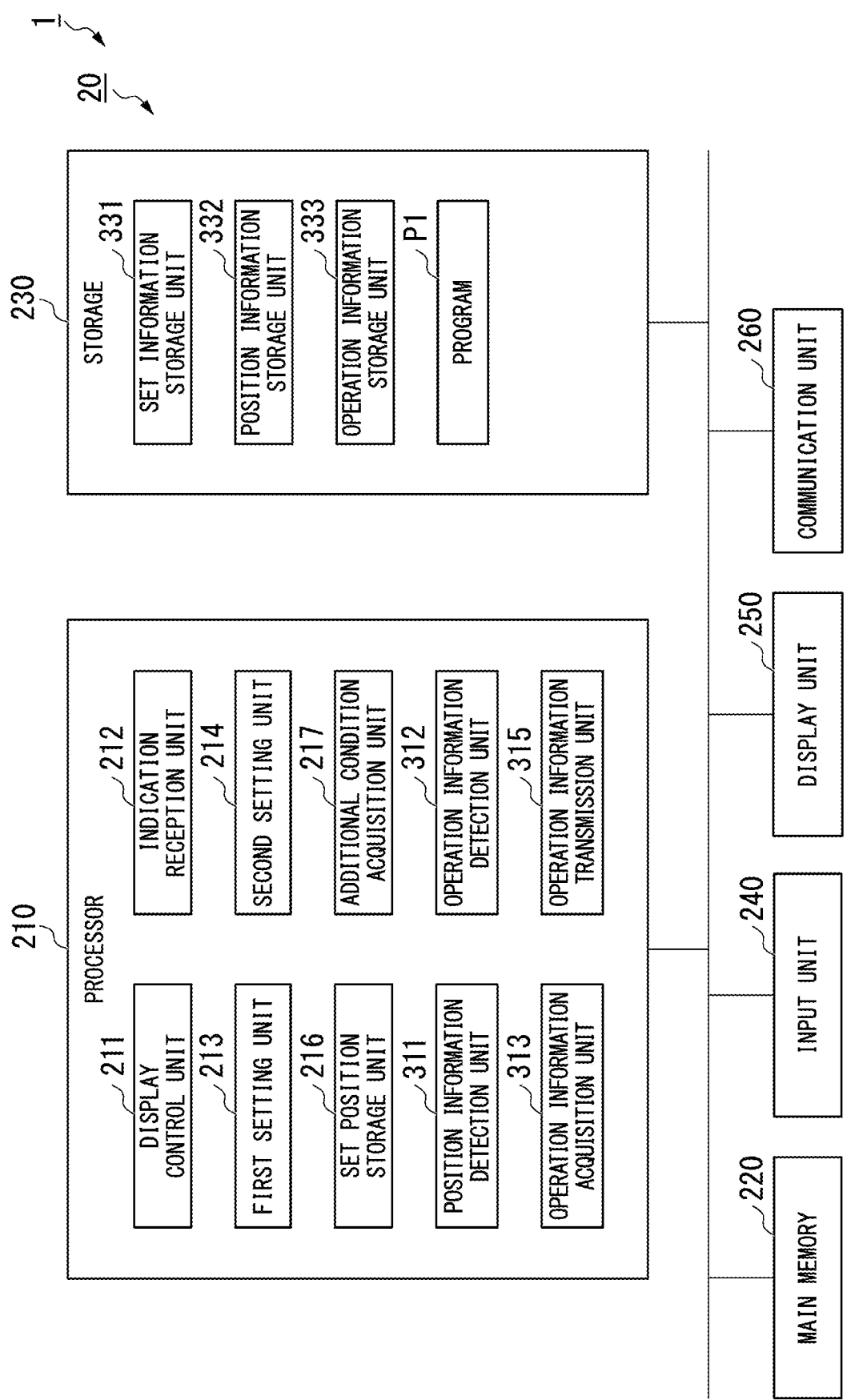
FIG. 15 is a diagram showing the functional configuration of a terminal according to a second embodiment.

FIG. 15 is a schematic view showing the functional configuration of the operation information acquisition system 1 according to the second embodiment.

The operation information acquisition system 1 according to the second embodiment is different from the operation information acquisition system 1 according to the first embodiment in that the terminal 20 also includes the functions of the operation information acquisition device. That is, the operation information acquisition system 1 according to the second embodiment has a configuration in which a terminal and an operation information acquisition device are integrated. Each component of the operation information acquisition system 1 according to the second embodiment has the same configuration and function as each component of the operation information acquisition system 1 according to the first embodiment unless particularly described.

For example, a terminal 20 according to the second embodiment may be provided in a cab or the like of the work vehicle 3. Therefore, the worker (driver) can set the acquisition conditions (acquisition start position and acquisition end position) of the operation information of the work vehicle 3 for the traveling route R using the terminal 20. The terminal 20 acquires the operation information of the work vehicle 3.

(Functional Configuration of Terminal)

As shown in FIG. 15, a processor 210 of the terminal 20 according to the second embodiment exhibits the functions as the position information detection unit 311, the operation information detection unit 312, and the operation information acquisition unit 313 in addition to the display control unit 211, the indication reception unit 212, the first setting unit 213, and the second setting unit 214. Furthermore, the processor 210 exhibits a function as a set position storage unit 216 instead of the set position transmission unit 215 according to the first embodiment. In addition, the processor 210 exhibits functions as an additional condition acquisition unit 217 and an operation information transmission unit 315 described below. Hereinafter, only functions different from the operation information acquisition system 1 according to the first embodiment will be described.

The set position storage unit 216 as an output unit stores information regarding the acquisition start position set by the first setting unit 213 and information regarding the acquisition end position set by the second setting unit 214 in the set information storage unit 331. That is, the set position storage unit 216 as an output unit outputs information regarding the set acquisition start position and acquisition end position to the set information storage unit 331.

The additional condition acquisition unit 217 can acquire an additional acquisition condition other than the acquisition start position and the acquisition end position as an acquisition condition of the operation information. The additional condition acquisition unit 217 acquires an additional acquisition condition input using the input unit 240. For example, in the second embodiment, a range (for example, equal to or higher than 10 km/h and equal to or lower than 20 km/h) of a vehicle speed of the work vehicle 3 is set as an additional acquisition condition. As the additional acquisition condition, for example, a lower limit or an upper limit of the vehicle speed of the work vehicle 3 may be set. The terminal 20 acquires the operation information only in a case where the additional acquisition condition is satisfied in addition to the acquisition conditions of the acquisition start position and the acquisition end position. The additional acquisition condition may not always be set. In other embodiments, an additional acquisition condition may be, for example, a condition relating to vibration, fuel efficiency, a posture, an operation signal, a shift stage, hydraulic pressure, a weight, or the like.

The operation information transmission unit 315 transmits the operation information stored in the operation information storage unit 333 by the operation information acquisition unit 313 through the communication unit 260. For example, the operation information transmitted from the operation information transmission unit 315 may be received by another dedicated terminal in the work vehicle 3 or a dedicated terminal provided in the management office C. Therefore, it is possible to execute the evaluation processing of the operation information of the work vehicle 3 in the work vehicle 3 or the management office C.

First Acquisition Example

Figure 16:
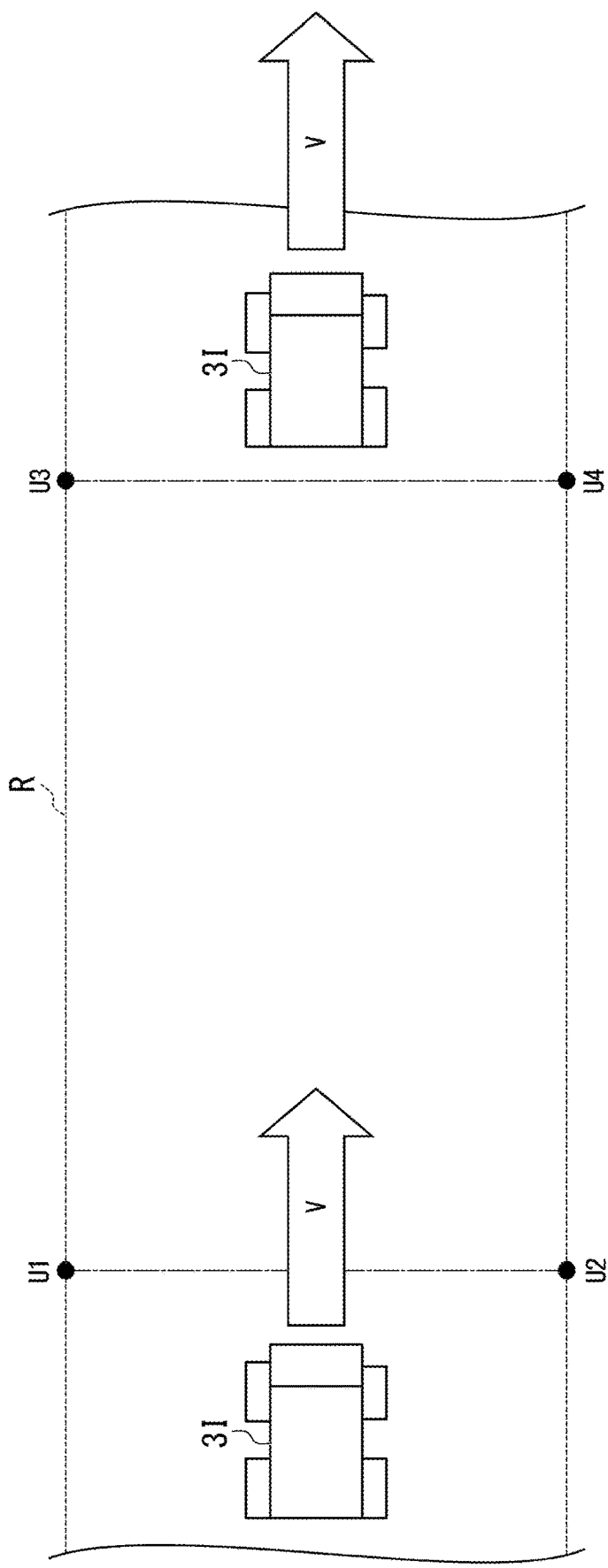
FIG. 16 is a first view of an acquisition example of operation information according to the second embodiment.

FIG. 16 is a first acquisition example of operation information according to the second embodiment.

In the above-described first embodiment, although a case where the acquisition conditions of the operation information set using the terminal 20 are only the acquisition start position and the acquisition end position has been described, an additional acquisition condition may be set.

In the first acquisition example, as shown in FIG. 16, in addition to an acquisition start position (U1U2) and an acquisition end position (U3U4), an additional acquisition condition is further set. Specifically, as the additional acquisition condition, a range of a vehicle speed (speed) V when a work vehicle 3I travels on the traveling route R from the acquisition start position (U1U2) to the acquisition end position (U3U4) is set to be, for example, equal to or higher than 10 km/h and equal to or lower than 20 km/h. It is assumed that the additional acquisition condition is stored in the set information storage unit 331 of the operation information acquisition device 30 along with information regarding the set acquisition start position (U1U2) and acquisition end position (U3U4).

As shown in FIG. 16, in a case where the work vehicle 3T travels on the traveling route R in a direction of an arrow and travels at the vehicle speed V satisfying the above-described acquisition condition (the range of the vehicle speed is equal to or higher than km/h and equal to or lower than 20 km/h) until passing through the acquisition end position (U3U4) after passing through the acquisition start position (U1U2), the operation information acquisition device 30 acquires operation information of the work vehicle 3I from the acquisition start position (U1U2) to the acquisition end position (U3U4).

On the other hand, even though the work vehicle 3I travels on the traveling route R in the direction of the arrow, and has passed through the acquisition end position (U3U4) after having passed through the acquisition start position (U1U2), in a case where the work vehicle 3I does not travel at the vehicle speed V satisfying the above-described acquisition condition (the range of the vehicle speed is equal to or higher than km/h and equal to or lower than 20 km/h), the operation information acquisition device 30 does not acquire the operation information of the work vehicle 3I.

In the first acquisition example, since the acquisition conditions of the operation information set using the terminal 20 are the acquisition start position and the acquisition end position, and the additional acquisition condition is set, it is possible to limit the operation information to be acquired in more detail. Therefore, it is possible to further limit and extract the operation information to be evaluated in a stage of acquiring the operation information of the work vehicle 3. Accordingly, it is possible to improve the efficiency of the evaluation processing of the operation information.

(Operations and Effects)

As described above, the terminal 20 of the operation information acquisition system 1 according to the second embodiment also has the functions of the operation information acquisition device.

With the configuration described above, the worker (driver) of the work vehicle 3 can easily set the acquisition conditions (acquisition start position, acquisition end position, and the like) of the operation information. Accordingly, the worker can suitably set the acquisition conditions (acquisition start position, acquisition end position, and the like) according to an environment of a site. Furthermore, the acquired operation information can be evaluated, and the worker who is in the site can immediately set the acquisition conditions (acquisition start position, acquisition end position, and the like) according to an evaluation result.

According to the second embodiment, the operation information acquisition device 30 further includes the additional condition acquisition unit 217 that acquires a predetermined condition for setting such that the operation information acquisition unit 313 acquires the operation information only in a case where the predetermined condition (additional acquisition condition) relating to the work vehicle 3 is satisfied. Therefore, it is possible to limit, set, and acquire the operation information to be acquired in more detail. Accordingly, it is possible to improve the efficiency of the evaluation processing of the operation information.

Other Embodiments

Although the embodiment has been described above in detail referring to the drawings, a specific configuration is not limited to the above-described configuration, and various design changes and the like can be made.

For example, in the above-described embodiment, although the number of work vehicles 3 is two, the number of work vehicles 3 may be one or three or more. In the above-described embodiment, although all work vehicles 3 are the same type (dump truck), the types of a plurality of work vehicles 3 may be different.

In the above-described embodiment, although the work site A is a mining site where strip mining is performed, the work site A may be an area having any shape where the work vehicle 3 is travelable.

In the above-described embodiment, although a case where the setting of the acquisition conditions of the operation information by the terminal 20 is performed before the acquisition of the operation information has been described, the setting of the acquisition conditions of the operation information by the terminal 20 may be performed during the acquisition of the operation information and after the acquisition of the operation information.

In the operation information acquisition system 1 according to the above-described embodiment, although a work target that the work vehicle 3 loads, carries, dumps, or the like is earth or a product, the work target is not limited thereto in other embodiments. For example, a work target according to other embodiments may be ore, crushed stone, coal, or the like.

In the operation information acquisition system 1 according to the above-described embodiment, although a case where the programs P1 and P2 are stored in the storages 230 and 330, respectively, has been described, the invention is not limited thereto.

For example, in other embodiments, the program P1 may be distributed to the terminal 20 by a communication line. In this case, the terminal 20 that receives the distribution develops the program P1 to the main memory 220 and executes the above-described processing.

The programs P1 and P2 may realize part of the above-described functions. For example, the program P1 may be programs for realizing the above-described functions in combination with another program already stored in the storage 230 or in combination with another program installed on another device.

The terminal 20 and the operation information acquisition device 30 may include a programmable logic device (PLD) in addition to the above-described configuration or instead of the above-described configuration. Examples of the PLD include a programmable array logic (PAL), a generic array logic (GAL), a complex programmable logic device (CPLD), and a field programmable gate array (FPGA). In this case, part of the functions that are realized by the processor may be realized by the PLD.

INDUSTRIAL APPLICABILITY

According to the above-described aspect, it is possible to extract operation information to be evaluated in a stage of acquiring operation information of a work vehicle.

REFERENCE SIGNS LIST 1 operation information acquisition system
3 (3A to 3I) work vehicle
20 terminal
30 operation information acquisition device
31 position information detection device
32 vibration information detection device
33 vehicle speed information detection device
34 fuel efficiency information detection device
35 posture information detection device
36 operation signal detection device
37 shift stage information detection device
38 hydraulic pressure information detection device
39 weight information detection device
210 processor
211 display control unit
212 indication reception unit
213 first setting unit
214 second setting unit
215 set position transmission unit
216 set position storage unit
217 additional condition acquisition unit
220 main memory
230 storage
231 map information storage unit
240 input unit
250 display unit
260 communication unit
310 processor
311 position information detection unit
312 operation information detection unit
313 operation information acquisition unit
314 set position reception unit
320 main memory
330 storage
360 communication unit
331 set information storage unit
332 position information storage unit
333 operation information storage unit
A work site
C management office
G (G1, G1') loading site
G2 dumping site
P1 program
P2 program
R traveling route
SC intermediate start position
SE intermediate end position
T1 to T2 first indication information
T3 to T4 second indication information
U1 to U4 absolute position
U1' to U4' absolute position
W wheel

The invention claimed is:

1. A terminal comprising:
a display unit;
a map information storage unit that stores map information relating to a map including a traveling route of a work vehicle in association with absolute position information, the absolute position information being information indicating an absolute position on predetermined absolute coordinates including latitude information and longitude information;
a display control unit that displays the map on the display unit;
an indication reception unit that receives first indication information indicating, on the map, an acquisition start position where acquisition of operation information of the work vehicle starts and second indication information indicating, on the map, an acquisition end position where the acquisition of the operation information ends;
a first setting unit that calculates absolute positions on the absolute coordinates corresponding to the first indication information and sets the absolute positions as the acquisition start position to cross the traveling route based on the map information and the first indication information;

a second setting unit that calculates absolute positions on the absolute coordinates corresponding to the second indication information and sets the absolute positions as the acquisition end position to cross the traveling route based on the map information and the second indication information; and an output unit that outputs information regarding the set acquisition start position and acquisition end position.

2. The terminal according to claim 1,
wherein each of the first indication information and the second indication information includes information regarding positions of two or more points on the map.

3. The terminal according to claim 1,
wherein the map information includes information regarding a predetermined area that is connected to the traveling route.

4. The terminal according to claim 3,
wherein at least one of the acquisition start position and the acquisition end position is set at an entrance of the predetermined area.

5. The terminal according to claim 1,
wherein the terminal is mounted in the work vehicle, and the terminal further comprises:
  a set information storage unit that stores information regarding the set acquisition start position and acquisition end position;
  a position information detection unit that detects a current position of the work vehicle and outputs current position information;
  an operation information detection unit that detects an operation status of the work vehicle and outputs the operation information; and
  an operation information acquisition unit that compares the current position information of the work vehicle with information regarding the acquisition start position and the acquisition end position, and in a case where determination is made that the work vehicle has passed through the acquisition end position after having passed through the acquisition start position, acquires the operation information from the acquisition start position to the acquisition end position.

6. The terminal according to claim 5, further comprising:
an additional condition setting unit that, only in a case where a predetermined condition relating to the work vehicle is satisfied, sets the predetermined condition such that the operation information acquisition unit acquires the operation information.

7. An operation information acquisition system comprising:
  the terminal according to claim 1; and
  an operation information acquisition device that is mounted in the work vehicle and acquires the operation information,
  wherein the operation information acquisition device includes
    a storage unit that stores information regarding the set acquisition start position and acquisition end position,
    a position information detection unit that detects a current position of the work vehicle and outputs current position information,
    an operation information detection unit that detects operation information of the work vehicle and outputs the operation information, and
    an operation information acquisition unit that compares the current position information of the work vehicle with information regarding the acquisition start position and the acquisition end position, and in a case where determination is made that the work vehicle has passed through the acquisition end position after having passed through the acquisition start position, acquires the operation information from the acquisition start position to the acquisition end position.

8. The operation information acquisition system according to claim 7,
  wherein the operation information acquisition device further includes
    an additional condition setting unit that, only in a case where a predetermined condition relating to the work vehicle is satisfied, sets the predetermined condition such that the operation information acquisition unit acquires the operation information.

9. An operation information acquisition method comprising:
  a step of displaying a map including a traveling route of a work vehicle on a display unit;
  a step of receiving first indication information indicating, on the map, an acquisition start position where acquisition of operation information of the work vehicle starts and second indication information indicating, on the map, an acquisition end position where the acquisition of the operation information ends;
  a step of calculating absolute positions on the absolute coordinates corresponding to the first indication information and setting the acquisition start position to cross the traveling route based on map information associated with absolute position information and the first indication information, the absolute position information being information indicating an absolute position on predetermined absolute coordinates including latitude information and longitude information;
  a step of calculating absolute positions on the absolute coordinates corresponding to the second indication information and setting the acquisition end position to cross the traveling route based on the map information and the second indication information; and
  a step of outputting information regarding the set acquisition start position and acquisition end position.

10. The operation information acquisition method according to claim 9, further comprising:
  a step of detecting a current position of the work vehicle and outputting current position information;
  a step of detecting the operation information of the work vehicle and outputting the operation information; and
  a step of comparing the current position information of the work vehicle with information regarding the acquisition start position and the acquisition end position, and in a case where determination is made that the work vehicle has passed through the acquisition end position after having passed through the acquisition start position, acquiring the operation information from the acquisition start position to the acquisition end position.

11. A solid stage storage for storing a processor readable program causing a computer to execute:
  a step of displaying a map including a traveling route of a work vehicle on a display unit;

a step of receiving first indication information indicating, on the map, an acquisition start position where acquisition of operation information of the work vehicle starts and second indication information indicating, on the map, an acquisition end position where the acquisition of the operation information ends;

a step of calculating absolute positions on the absolute coordinates corresponding to the first indication information and setting the acquisition start position to cross the traveling route based on map information associated with absolute position information and the first indication information, the absolute position information being information indicating an absolute position on predetermined absolute coordinates including latitude information and longitude information;

a step of calculating absolute positions on the absolute coordinates corresponding to the second indication information and setting the acquisition end position to cross the traveling route based on the map information and the second indication information; and a step of outputting information regarding the set acquisition start position and acquisition end position.

12. The solid stage storage for storing the processor readable program according to claim 11, causing the computer to further execute:

a step of detecting a current position of the work vehicle and outputting current position information a step of detecting the operation information of the work vehicle and outputting the operation information; and a step of comparing the current position information of the work vehicle with information regarding the acquisition start position and the acquisition end position, and in a case where determination is made that the work vehicle has passed through the acquisition end position after having passed through the acquisition start position, acquiring the operation information from the acquisition start position to the acquisition end position.

* * * * *